United States Patent [19]

Scavezze et al.

[11] Patent Number: 4,967,344
[45] Date of Patent: Oct. 30, 1990

[54] INTERCONNECTION NETWORK FOR MULTIPLE PROCESSORS

[75] Inventors: Daniel C. Scavezze, Chelmsford, Mass.; Miriam E. Leeser, Ithaca, N.Y.; Gerald A. Kammerer, Wrentham; William R. Prescott, Plainville, both of Mass.

[73] Assignee: Codex Corporation, Mansfield, Mass.

[21] Appl. No.: 162,820

[22] Filed: Mar. 1, 1988

Related U.S. Application Data

[63] Continuation-in-part of Ser. No. 716,348, Mar. 26, 1985, abandoned.

[51] Int. Cl.⁵ .................... G06F 11/20; G06F 13/36
[52] U.S. Cl. ................... 364/200; 364/229.2; 364/268.7; 364/269.2
[58] Field of Search ... 364/200 MS File, 900 MS File; 371/8.2, 11.2

[56] References Cited

U.S. PATENT DOCUMENTS

| | | | |
|---|---|---|---|
| 3,882,455 | 5/1975 | Heck et al. | 364/200 |
| 4,228,496 | 10/1980 | Katzman et al. | 364/200 |
| 4,490,785 | 12/1984 | Strecker et al. | 364/200 |
| 4,597,084 | 6/1986 | Dynneson et al. | 364/200 |
| 4,649,384 | 3/1987 | Shaefor et al. | 371/7 X |

Primary Examiner—Thomas M. Heckler
Attorney, Agent, or Firm—Fish and Richardson

[57] ABSTRACT

A large number (e.g., 20 or more) independent processors are connected by a network that provides high data throughput (e.g., 64 megabits/second). The network has redundant data, arbitration, and status/control buses. The buses extend across a plurality of microstripline backplanes connected together by impedance-matched twisted-pair cables. Data is transmitted in packets, along with status signals that provide error detection information.

24 Claims, 26 Drawing Sheets

L=LENGTH
DA=DESTINATION ADDRESS
SA=SOURCE ADDRESS
$D_n$=DATA BYTES
CS=CHECK SUM

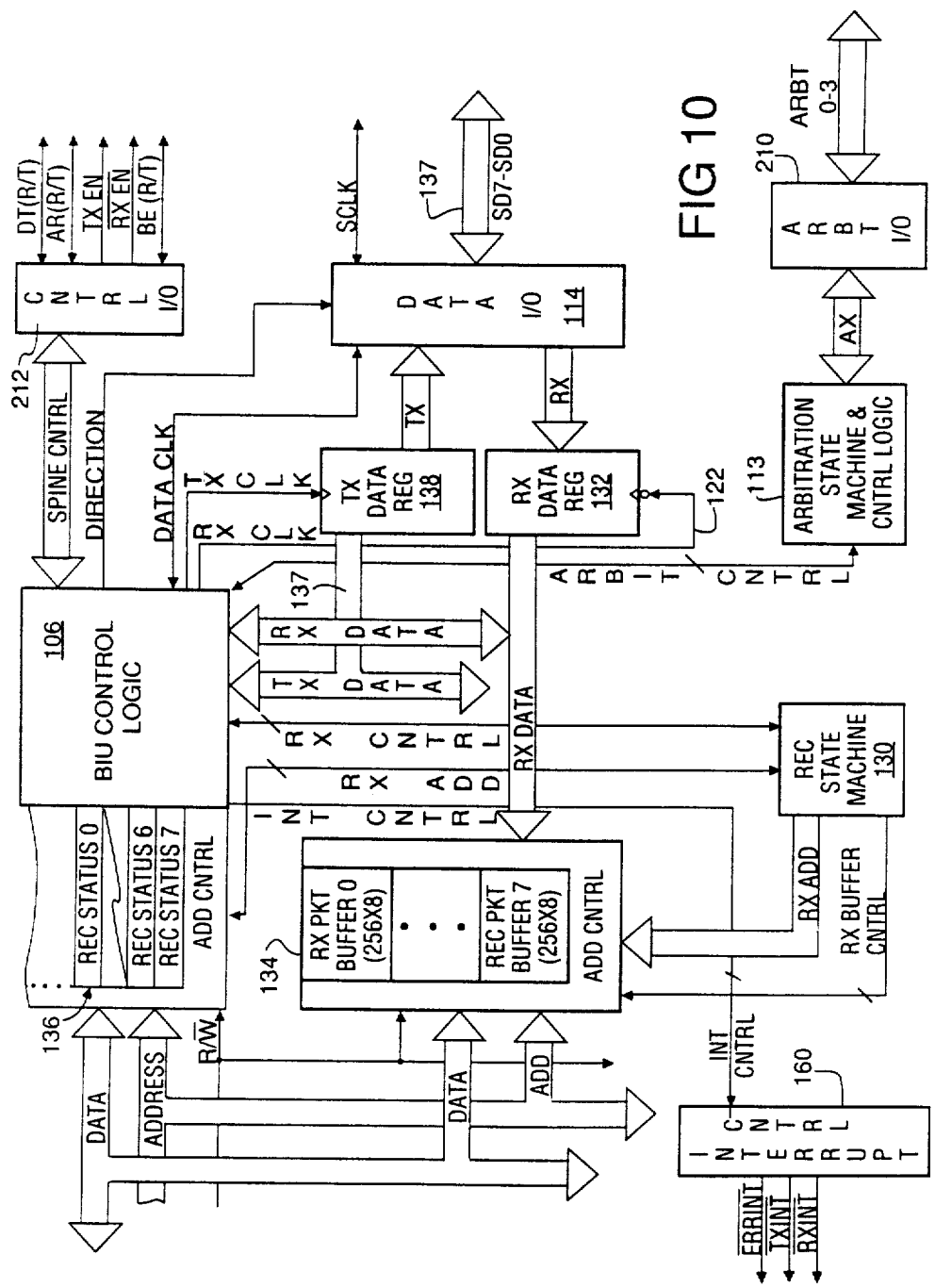

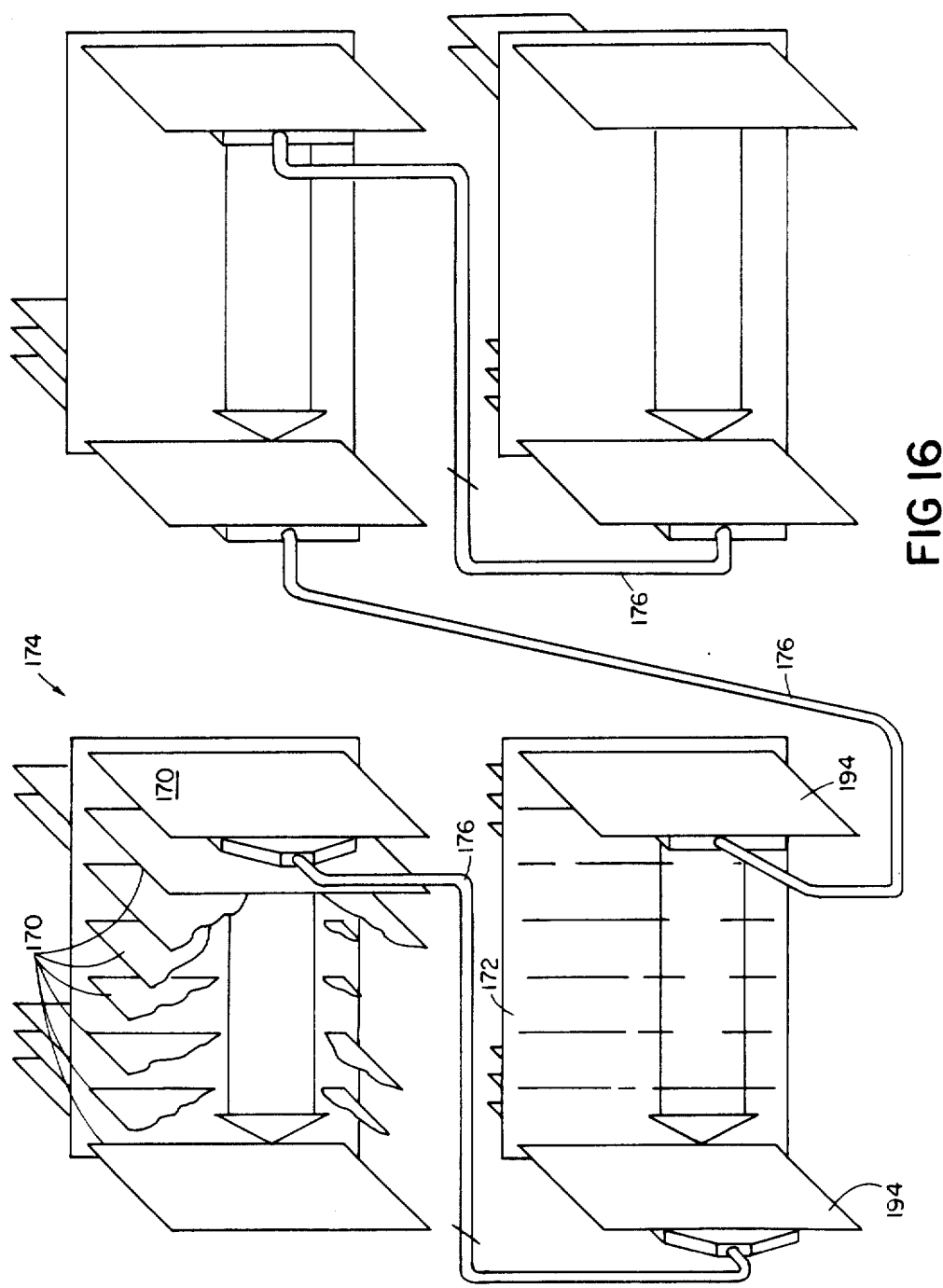

TABLE
HOST INTERFACE TIMING SPECIFICATION

| SYMBOL | PARAMETER | MIN | TYP | MAX |
|---|---|---|---|---|
| T | HSCLK PERIOD | | 625 | |
| $t_{CEI}$ | $\overline{CE}$ Inactive Time | 150 | | |
| $t_{AVS}$ | Address Setup from $\overline{CE}$ | 40 | | |
| $t_{SCD}$ | $\overline{CE}$ setup from $\overline{DS}$ | −40 | | +40 |
| $t_{DDR}$ | $\overline{DS}$ low to $\overline{DTACK}$ low (read cycle) (note 3) | | | 90 |
| $t_{DDW}$ | $\overline{DS}$ low to $\overline{DTACK}$ low (write cycle) (note 3&4) | | | 90 |
| $t_{SDD}$ | Data Out Valid setup time from $\overline{DTACK}$ low | | | 80 |
| $t_{AC}$ | $\overline{CE}$ low to Data Out Valid (note 1) | | | 150 |
| $t_{AD}$ | $\overline{DS}$ low to Data Out Valid (note 1) | | | 150 |
| $t_{HR}$ | Data out Hold Time from $\overline{DS}$ inactive | 0 | | |
| $t_{BO}$ | $\overline{CE}$ high to DB tristate | | | 60 |
| $t_{SW}$ | Data In Setup Time to $\overline{DS}$ active | 30 | | |
| $t_{HW}$ | Data In Hold Time from $\overline{DS}$ inactive | 30 | | |
| $t_{HCD}$ | $\overline{CE}$ hold from $\overline{DS}$ inactive | −40 | | +40 |
| $t_{HAD}$ | Address Hold from $\overline{DS}$ inactive | 30 | | |
| $t_{HRD}$ | R/$\overline{W}$ hold from $\overline{DS}$ inactive | 0 | | |
| $t_{HDD}$ | $\overline{DTACK}$ hold from $\overline{DS}$ inactive | 0 | | 100 |
| $t_{SRD}$ | R/$\overline{W}$ Setup Time from $\overline{DS}$ active | 55 | | 185 |

ALL TIMES IN NANOSECONDS

FIG 19A

INTERCONNECTION NETWORK FOR MULTIPLE PROCESSORS

RELATED APPLICATIONS

This is a continuation-in-part of U.S. application Ser. No. 716,348 filed Mar. 26, 1985, now abandoned, having the same title, by Daniel C. Scauezze et al.

BACKGROUND OF THE INVENTION

The invention relates to networks for transmitting data between processors. There exists a need to connect a large number of independent processors (e.g., 20 or more) with a data bus or network that will provide very high data throughput (e.g., 64 megabits/second) between any two processors.

SUMMARY OF THE INVENTION

We have discovered a network for providing high throughput between a large number of independent processors. Our invention has several aspects. In a first aspect, redundancy is provided by dividing a parallel data bus into at least first and second buses (e.g., two 8-bit wide buses) each of which is capable of carrying transmitted data independently of the other; in normal operation both buses are in use (e.g., 16-bit words are divided for transmission, with 8 bits going over each bus), but after a failure in the network, the bus on the good side of the network takes over transmission of all data (e.g., 16-bit words are transmitted as two 8-bit words). In preferred embodiments, there are also first and second arbitration buses, only one of which is used in normal operation; a dedicated fault-detect line is provided for informing the processors of which bus (or buses) remains functioning; a collision avoidance arbitration scheme is provided in which the processor with the highest priority code (or address) wins arbitrations but in which any further access to the bus by a winning processor is restricted until the end of that "round-"—defined as when an idle condition is encountered (a period during which no other processors achieve access to the data bus); arbitration is performed by contending processors by sequentially applying successive portions of their priority codes to the arbitration bus; data transmissions and arbitrations are pipelined, i.e., the arbitration that determines which processor will transmit during a given data transmission interval is accomplished during the preceding data transmission interval; and a single control signal initiates both data transmission and arbitration.

The invention assures that a single point failure will not totally disable the network. Any fault in the data, status, clock, or control area can only affect a portion of the data, and error detection methods can detect such errors, after which the redundant buses can be used. Any fault in the arbitration area will result in some violation of the arbitration protocol, and thus will be detected and corrected using the redundant arbitration bus.

The arbitration scheme provides priority access for selected processors, while at the same time assuring that every processor will obtain access to the bus within a known maximum waiting period (maximum number of processor transmissions in a round multiplied by the maximum time allowed for each transmission). In periods of heavy traffic, processors are allocated the bus on a "round robin" basis. In light periods, processors with more data to send are given correspondingly more access to the bus, irrespective of their priority ranking.

In a second aspect, the invention features a parallel data bus comprising a plurality of backplanes with microstriplines and a plurality of twisted-pair cables interconnecting the backplanes, with each microstripline on the backplane impedance matched to the interconnecting twisted-pair cable. In preferred embodiments, ground strips are interspersed between the data bus pairs of microstriplines, to reduce noise and crosstalk; arbitration lines are single-ended and implemented as single microstriplines on said backplanes; ground strips are interspersed between the single microstriplines; and the speed of data transmission on the single-ended arbitration lines is slower than on the differential data bus lines.

In a third aspect, data is transmitted in packets across the data bus, and separate status lines are provided for returning acknowledgement messages to the transmitting processor. In preferred embodiments, source and destination addresses and a check sum are transmitted with each packet; and the status signals include an address-recognized signal, a receive-buffer-available signal, and a check-sum acknowledgement signal.

Other features and advantages of the invention will be apparent from the following description of a preferred embodiment of the invention and from the claims.

DESCRIPTION OF THE PREFERRED EMBODIMENT

FIG. 10 is a block diagram of the BIU receiver section.

FIG. 16 is a perspective view of groups of processor circuit boards installed on microstripline backplanes connected by twisted-pair of cables.

FIG. 19A is a table of the host interface timing specifications.

Figure 1:
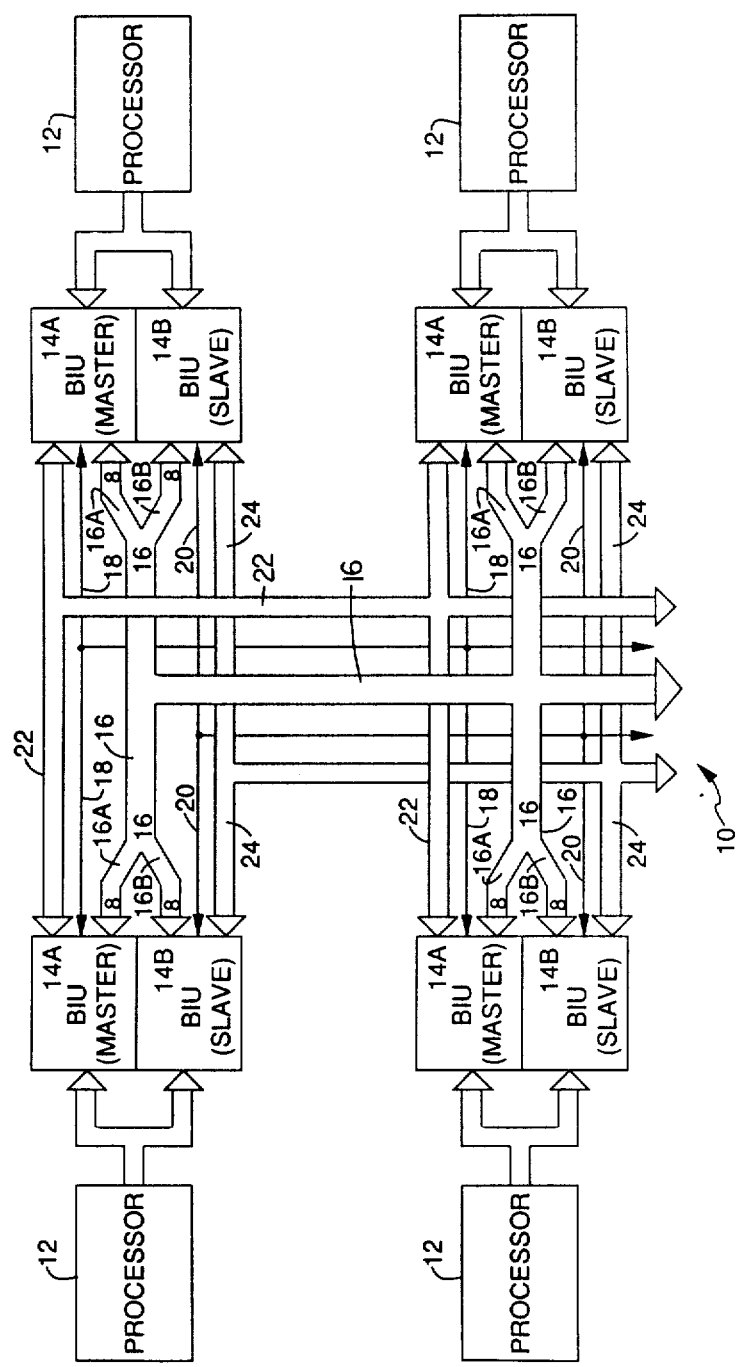
FIG. 1 is a block diagram of said embodiment, showing four processors connected to the network

Shown in FIG. 1 is an interconnection network 10 (the "SPINE") connecting a plurality of processors 12. Each processor 12 is connected to the SPINE by a pair of bus interface units 14 (or BIUs), a master BIU 14A and a slave BIU 14B. The SPINE consists of a parallel 16-bit-wide data bus 16 divided into 8 bit wide master and slave data buses, 16A and 16B respectively, master and slave clock lines 18, 20, and master and slave control, status, and arbitration lines 22, 24. A maximum of 124 processors (preferably no more than 72) may be connected over a maximum distance of 100 feet. Control is distributed equally among the connected processors and there is no centralized clock. Each BIU 14 has identical master and slave portions, each of which performs the functions of receiver, transmitter, and arbitrator.

The BIU is the bus interface circuit which allows a processor 12 to interface with the SPINE bus 10. The BIU 14 interfaces on one side with the processor 12 and on the other side with a number of SPINE bus transceivers (described below). The SPINE bus is a series of microstripline backplanes and twisted-pair cables. The SPINE bus 10 is terminated in its characteristic impedance at the extreme end of the bus. The SPINE bus 10 contains both single-ended, Wire-OR'ed signals and differential multiplexed signals, each running at different (but harmonically related) data rates.

Each SPINE node that has data ready to send arbitrates for access to data bus 16 using the BIU arbitration section. Arbitration is performed on the SPINE arbitration bus (22 or 24) and the winner gains control of the data bus 16 for the next data transmit cycle. In any cycle, a particular BIU 14 can act as a data transmitter (putting data on the bus) or a receiver (reading data from the bus). A BIU 14 becomes a transmitter when it has a data packet to send and gains control of the SPINE. A BIU 14 acts as a receiver when it recognizes its unique address as the destination address of a data packet. A BIU 14 may send data to itself for diagnostics, in which case it acts as both transmitter and receiver in the same data cycle.

A SPINE bus cycle is the period of time in which a processor 12 contends for and gains control of the SPINE or transmits one data packet. The arbitration phase and data transfer phase of a bus cycle may overlap. When the SPINE is busy, the contention is decided while the previous winner is transferring data. After a processor 12 has won an arbitration and sent a data packet on the next bus cycle, it normally must wait until all other processors wanting to send have done so before it can send another data packet.

Data are normally transferred two 8-bit bytes at a time across the data bus 16 on both the master and slave halves 16A and 16B of the bus 16, and only the master arbitration bus 22 is in use. Transmitting processors use the two 8-bit halves 16A and 16B to send 16-bit words, 8 bits on each half (8 most significant bits on master 16A, 8 least significant bits on slave 16B). After a system fault, only the good half (master or slave) of the SPINE is used and either the master or slave arbitration bus, 22 or 24 respectively, depending upon which side had the fault. For instance, if the master half of the SPINE is the good half then the master data and arbitration buses will be used. If, however, the master data or arbitration half of the SPINE fails, the slave half of SPINE will be used. Transmitting processors detecting the system fault break up each 16-bit data word into two 8-bit bytes and send the two halves in series across the good bus. As all systems are duplicated, including the BIUs and the SPINE, a single point fault will not cause a system failure, only a reduction (by half) in the rate of data throughput.

Addressing and Arbitration

Each of the 124 possible BIUs 14 is assigned a physical address between 0 and 123. These addresses are used for arbitration and as source and destination addresses of data packets. Arbitration is based entirely on these physical addresses. When more than one BIU contends for access to the data bus 16, the lower-numbered BIU always wins. The physical addresses of all the processors are loaded by each processor 12 during system configuration into both a physical address register and a packet address register. The address 124 may not be used as a physical device address. It is used to indicate an idle cycle during bus arbitration. The address 255 is used as a "broadcast" address in data packets, to send data simultaneously to all processors.

Data Movement Modes

There are three data movement modes. In the normal mode, a data packet (discussed in greater detail below) is transferred between two BIUs; the receiving BIU is determined by the destination address, which is the second byte of the data packet; the address of the transmitting BIU is the third byte of the data packet. In the broadcast mode, when the destination address is 255, all BIUs receive the data packet, and none of the status lines are driven. In the limited-monitor mode, a BIU receives all data packets when the BIU has available buffers. In this mode, the BIU does not drive any of the status lines.

SPINE Signals

All of the signals on the SPINE are distributed in parallel to all BIUs. There are two types of lines carrying signals: open-collector lines and differential lines. Open-collector lines carry wire-ORed signals and are driven by more than one BIU at a time. Terminators at each end pull up these lines to the inactive state (high). Differential lines are driven and received differentially for high speed and high noise immunity. These lines never have more than one BIU driving them at one time. They are terminated at each end in their characteristic impedance.

Figure 2:
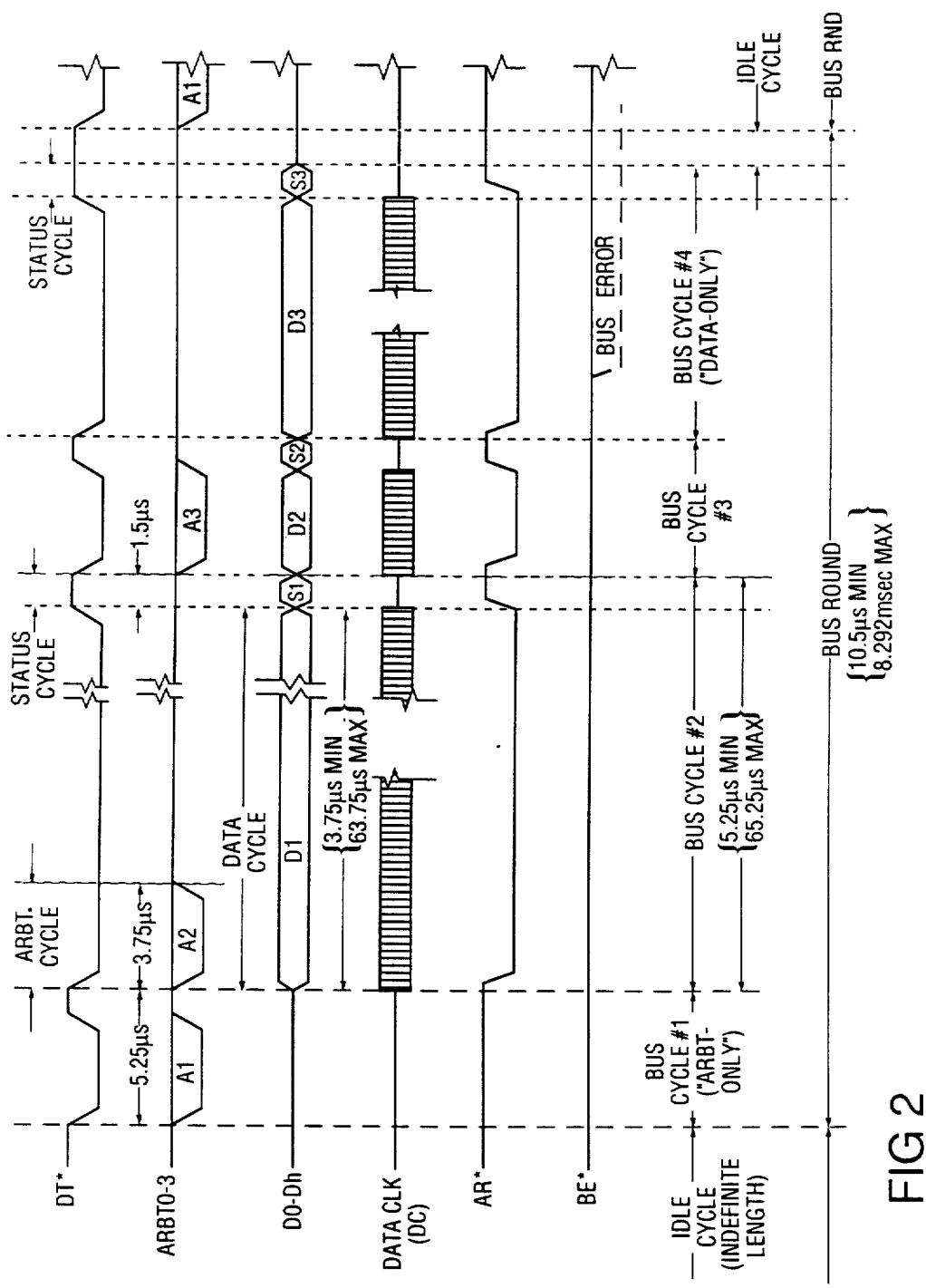
FIG. 2 is a timing diagram for said embodiment.

There are six types of signals. FIG. 2 shows a timing diagram of the signals. A "*" after the name of a signal indicates that it is active when low. There are master and slave versions of all of these signals. All of the signals pass through XCVR interface circuits 30, 32 (FIG. 3) connecting the data and arbitration buses to the BIUs. The interface circuit 30 for control and arbitration lines employ open-collector lines which differs from the interface circuit 32 for data, clock and direction lines which use differential lines. In addition, all open-collector signals have an interface circuit that allows signals to be transmitted and received simultaneously.

Data Transfer Control Line (DT*)

The low state of this open-collector line indicates data movement on the bus, and the high-to-low transition of this signal starts arbitration. After a BIU has won arbitration and the DT* line is in the high state, the winning BIU drives the DT* line to the low state until its entire packet has been sent or a minimum of 3.75 microseconds has elapsed. The DT* line must be low a minimum of 3.75 microseconds to allow the completion of bus arbitration started by the high-to-low transition of the DT* line.

Data Bus Lines D0-Dn

Figure 3:
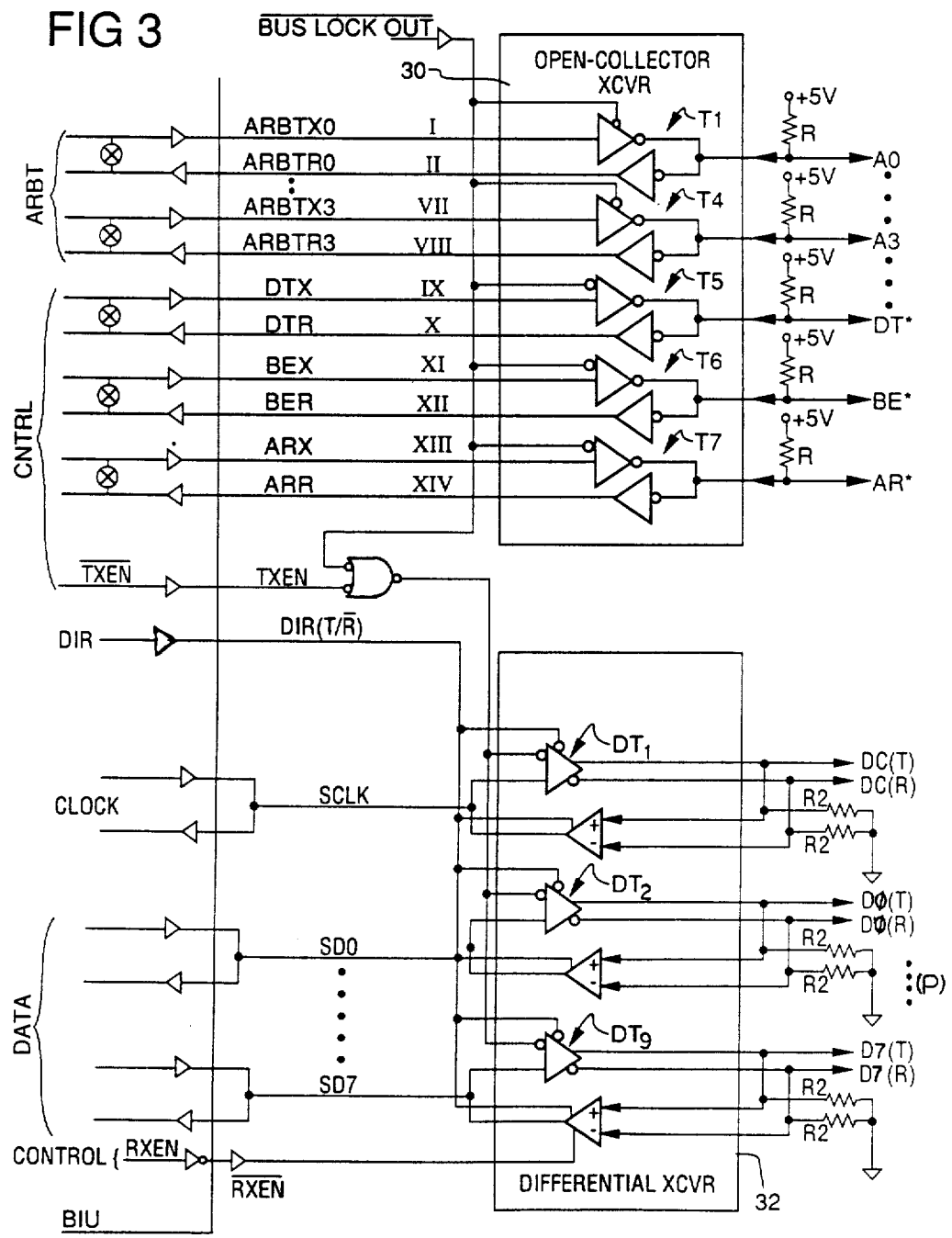
FIG. 3 is a schematic of the interface circuits between the buses and the bus interface units (BIUs).

The data are transmitted and received in parallel on these differential lines one byte at a time when the DT* line is low. Dn is the most significant bit of the bus. The data format is nonreturn to zero (NRZ) at a four megabit signaling rate and is clocked out by the rising edge of the data clock. The direction of the bidirectional data bus is controlled by the BIU via a directional signal DIR (FIG. 3).

Data Clock (DC)

The data clock is a differential line, providing a four megaHertz square wave with the low-to-high transition defined as the rising edge. The DC is generated by the transmitting BIU and is only sent when DT* is low and data are being sent. During data reception, DC is received and its falling edge is used to strobe the incoming data into the BIU.

Address Recognize (AR*)

The low state of this open-collector line indicates that a BIU has recognized the destination address as its own. AR* is asserted during the data transfer, soon after Destination Address is recognized, and is turned off by the rise of the DT* line. Broadcast messages do not cause AR* to be sent.

Bus Error (BE*)

The high state of this open-collector line indicates that the SPINE is in its normal data mode. After reset, both the master and slave BE* signals are set high and all processors use the full width of the data bus for transmission and reception of data packets. When a system failure has been detected by any of the processors, the processor sets the "good" BIU's BE* line low. All other BIUs on that half of the SPINE will detect the high-to-low transition of their BE* lines and respond by notifying their processors, which will switch over to the "good" side of the SPINE bus. BE* must remain low for at least 500 ns to allow it to be reset by the processor.

Arbitration Bus (A0-A3)

These four open-collector lines make up the arbitration bus and are used by the SPINE to arbitrate for access to the data bus. The arbitration bus is run at a data rate of 800,000 bps during the arbitration cycle and is initiated by the falling edge of DT*.

Data Packet Format

Figure 4:
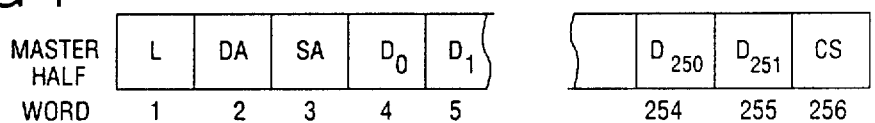
FIG. 4 shows the format of a data transmission.

The format of a data packet is shown in FIG. 4. There are four types of information in a data packet:

Length Count (L)

These bytes (one each on master and slave half) contain a number between 02 and FE (hexadecimal) that indicates the total number of bytes being sent on each half of the bus, data as well as control bytes.

Destination Address (DA)

These bytes contain the destination address of the data packet. It is either a number between 00 and FE, in which case it defines the unique address of the receiving BIU, or it is FF, indicating that the data packet is to be broadcast to all BIUs. The destination address must be the same for both the master and slave halves of the data packet.

Source Address (SA)

These bytes contain the address of the transmitting BIU and must be the same for both the master and slave halves of the data packet.

Data ($D_0$-$D_n$)

Each word of data contains two bytes, one sent on each half of the bus. Up to 255 bytes may be sent during a bus cycle.

Check Sum (CS)

These bytes each contain the check sum for the corresponding half of the data packet. The check sum is generated by the transmitting BIU, and regenerated by the receiving BIU to check for data errors. The check sum is accumulated in an 8-bit accumulator register (or ACCM).

Power On/Reset

Any SPINE node can be powered up or down independently of all other nodes, without affecting traffic on the SPINE. Each SPINE XCVR is designed so as not to load the SPINE when powered down. Also, the power on and reset timing allows any node to asynchronously power on and then synchronize itself to the ongoing SPINE traffic. When initially powered up, the processor sets the reset line to high, which causes the BIU to disable all SPINE bus lines. Following reset, the BIU begins a 3.75 microsecond monitoring period, during which it monitors the status of the DT* line. If DT* goes low before the end of the monitoring period, the BIU participates in the bus cycle initiated by DT* going low, thereby synchronizing itself with the rest of the SPINE. If no other BIU initializes a new bus cycle within 3.75 microseconds (i.e., DT* stays high), it is assumed that the SPINE is in an idle cycle and the BIU will pull DT* low and initialize a new bus round as soon as it has data to send. Any other BIU may initialize a new bus round during this period, and normal arbitration will avoid collisions.

Bus Cyle Timing

Data transmission on the SPINE is done in bus cycles, each consisting of a data transfer phase and a synchronization phase. Arbitration to determine which BIU and processor will send data during a particular data transfer phase is done during the data transfer phase of the previous bus cycle. Both arbitration and data transfer are initiated by the high-to-low transition of the DT* line. Each BIU that has data to send, and that has not sent all allowed data packets for that round, contends for the bus. The BIU with the lowest physical address wins the arbitration. This BIU waits for the DT* line to go high (indicating the end of a successful arbitration) and to be kept high for a minimum 1.5 microseconds (the duration of the synchronization phase). The winning BIU then drives the DT* line low for a time sufficient to transmit its entire data packet or 3.75 microseconds, whichever is longer. During this data transfer period, another arbitration takes place. At the end of the data transmission, the driving BIU releases DT*, which is then pulled high by the bus terminator.

The low-to-high transition of DT* initiates the sychronization phase and status cycle. During the 1.5 microsecond synchronization phase (when DT* is high), the receiving BIU transmits data-packet status bits, receive buffer available (RBA) and acknowledge (ACK), over data lines D0 and D1, respectively. This two-bit status word is transmitted asynchronously and sampled by the previously transmitting BIU 0.875 microseconds after DT* goes high. This protocol allows the SPINE to return data packet status to the transmitting BIU without using additional dedicated bus lines.

When no BIU contends during arbitration, all BIUs detect the idle condition and begin an idle cycle. An idle cycle marks the end of a bus round, making all BIUs again eligible to contend for the bus. These arbitration rules allow every processor to send at least one data packet in every bus round, and thus prevents a high-priority processor from hogging the bus. Provision is made, however, for a high-priority processor to be allowed to send more than one data packet per bus round.

BIU Control Section

The BIU is structured so that the transmitter, receiver, and arbitration sections are isolated from the operation of the host processor. This allows the SPINE node to operate on the transmitted data packets autonomously, thereby freeing the processor to perform less laborious chores. Therefore, most processor/BIU operations have been optimized to require as little addressing and control data movement as possible. All BIU-processor interactions (except for the actual data packet transfer) are done with a small number of registers in the BIU control section 106 (FIGS. 8, 10).

Figure 8:
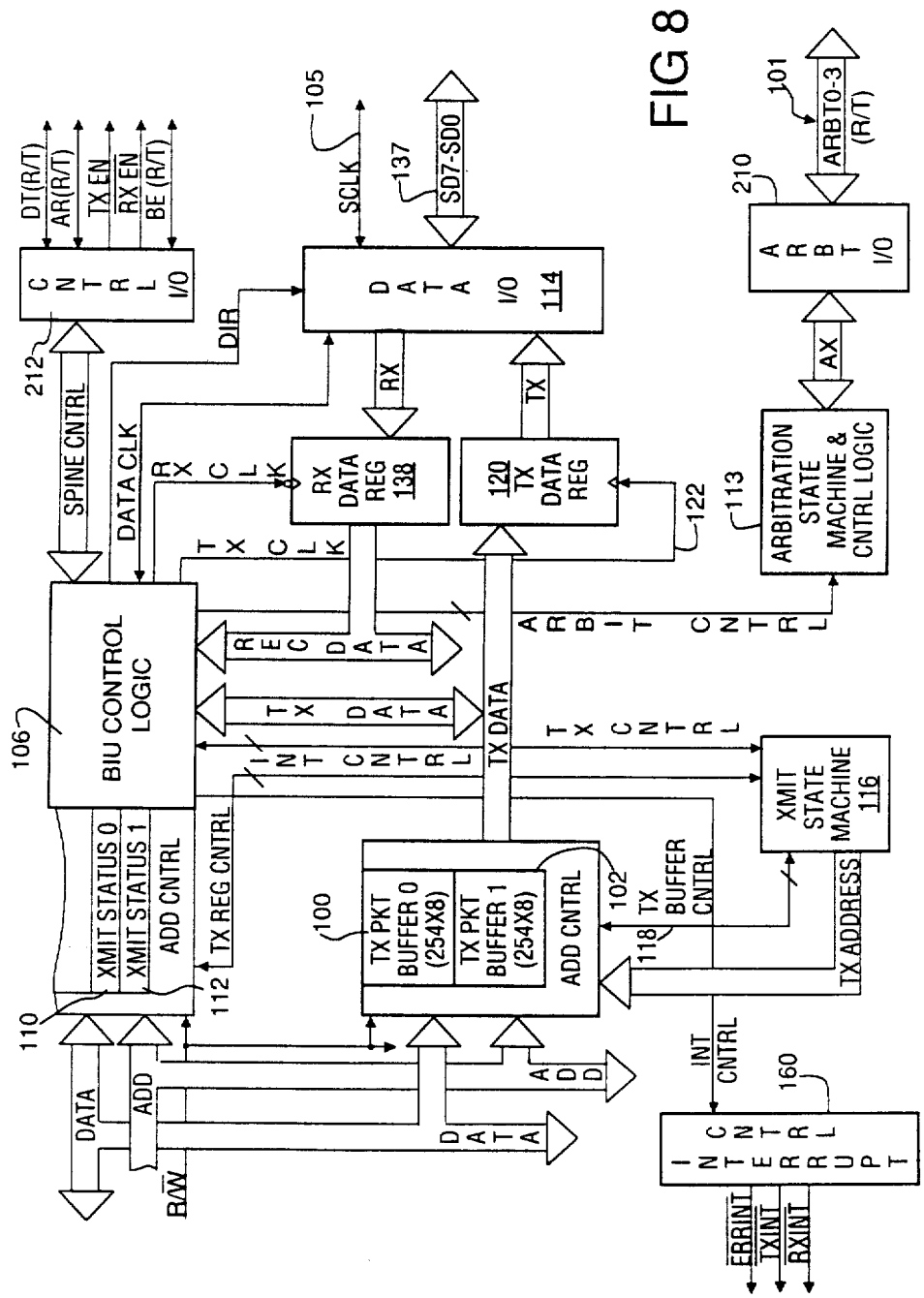
FIG. 8 is a block diagram of the bus interface unit (BIU) transmitter section.

As shown in FIGS. 8 and 10, each BIU interfaces with the SPINE bus transceivers 30, 32 through data, arbitration, and control buffers 114, 210, and 212, respectively.

The BIU control section 106 consists of the BIU control logic, and BIU control, status, and special purpose registers The control logic is combination logic which performs the following functions: checksum accumulation; timing; address control for registers; clock selection for transmit/receive data and the clock signal SCLK; interface BIU control signals; SPINE control signals; interrupt control signals; data acknowledge signals; bi-directional control of the SPINE data bus; reset procedures; and interfacing between BIU registers and the transmitting, receiving and arbitration state machines.

The registers which provide status and control for the BIU are divided into three groups: global, transmitter, and receiver registers. The global control and status registers pertain to the overall operation of the BIU chip. These include a physical address register, a last arbitration address register, BIU command registers, a BIU Status register, a diagnostic register, an interrupt status register, a priority register, and a master-/slave/expansion register. All global resisters are cleared to zero during the reset procedure. The transmitter and receiver registers are described below.

Arbitration

Arbitration is accomplished, by means of arbitration state machine and control logic circuitry 113 (FIGS. 8 and 10), using a distributed decision algorithm. There is no centralized controller or monitor making decisions. A common signal (the high to low transition of the DT line which is driven by the DTR line) defines the start of an arbitration cycle. All BIUs detect this event and use it as an asynchronous start for their arbitration timing. Each BIU then places a sequence of three 4-bit-wide nibbles, ARBT0-3, on the four arbitration bus lines (FIG. 3). The three nibbles are transmitted asynchronously at 800,000 bps. Every BIU must receive the three asynchronous nibbles and decode the winner of the arbitration, even if that BIU is not currently contending for the bus, so that every BIU can recognize the onset of an idle cycle, indicating the end of a bus round. The BIU address is converted to quinary (or base 5) by the arbitration algorithm. The first of the three nibbles consists of the most significant quinary address digit of each BIU that is contending during that arbitration cycle. This address digit is then encoded and placed on arbitration lines A3-A0, with the most significant address bit being placed on line A3.

Each BIU monitors the arbitration address lines during transmission of the first nibble. If the monitored lines match the address that a particular BIU has placed on the lines, the BIU remains in contention and encodes its next most significant address digit and places it on arbitration lines A3 through A0 as the second nibble. The maximum number of BIUs contending during the second nibble is twenty-five. Just as with the first nibble, the contending BIUs monitor the arbitration lines to determine if the address bits they have placed on the arbitration lines match what is actually on the lines. If a particular BIU senses that there is a match, that BIU contends during the third nibble. The maximum number of contending BIUs during the third nibble is five. During this nibble, the contending BIUs encode their least significant address digit and place it on arbitration lines A3 through A0. The BIU that senses the presence of the address it has asserted during this third nibble is the winner of the arbitration.

All BIUs monitor arbitration line A0 during the arbitration to detect whether it becomes a logic 0, indicating that a BIU has won the arbitration. A0 always becomes a logic 0 when one or more BIUs are contending during an arbitration. Accordingly, if A0 never becomes a logic 0 during the three-nibble arbitration, an idle state—no BIUs contending—has occurred, marking the end of a bus round. When an idle state has occurred, all four arbitration lines remain high at the end of the arbitration phase.

Unless a failure of one side of the SPINE has been detected, arbitration is only performed on the master side of the SPINE, using the master arbitration bus lines and master BIU arbitration outputs.

SPINE is designed to allow a number of peer processors 12 to reside on the SPINE bus 10. Each peer processor 12, together with its BIUs 14A and 14B, is an independent node. Each node has its own internal bus connecting the processor 12 and the BIUs 14 and 14B, and each node has its own power so that no single fault can cause a system failure. It is therefore a requirement of SPINE that any SPINE node can be powered up or down independently of all the other nodes in the system, without affecting normal SPINE bus traffic.

To meet this requirement, it is necessary to use SPINE transceivers 30, 32 (FIG. 3), that do not load the SPINE bus 10 when the node is powered down. It is also necessary to have a power on/reset procedure that will allow any node to asynchronously power on and subsequently synchronize itself to the ongoing SPINE bus traffic.

When a peer processor 12 is powered up, the peer processor must reset the BIUs 14A, 14B. During the reset procedure, all SPINE bus lines are disabled (The differential lines are tristate buffered, and the open collector lines are inhibited.) The reset procedure also clears all of the BIU control logic and registers.

Figure 17A:
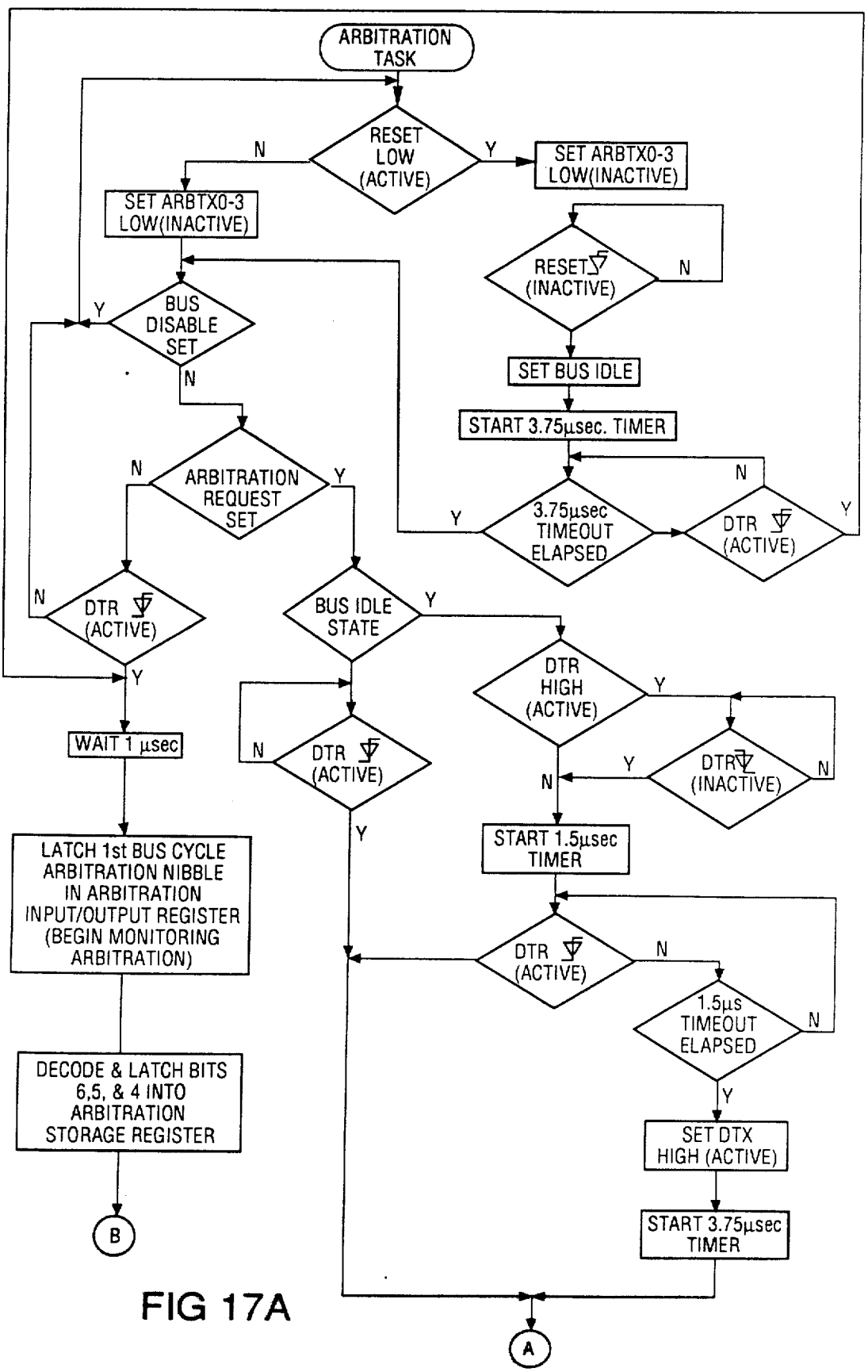
FIGS. 17A–17C are flow diagrams illustrating the general operation of the arbitration phase.

Referring to the flow diagram shown in FIG. 17A, following the reset procedure, the BIU starts a 3.75 usec timeout, during which it monitors the status of the DTR line. If DTR goes high before the end of the 3.75 microsecond timeout, the BIU participates in that particular bus cycle (but will not actively arbitrate for the bus), thereby synchronizing itself with the rest of SPINE. If no other BIU initializes a new bus cycle within 3.75 microsecond (i.e., if DTR remains low), and if the BIU has data to send, and if the SPINE bus is in an idle cycle, the BIU will pull DTR high and initialize a new bus round. Any other BIU is also free to initialize a new bus round during this period and normal arbitration will occur to resolve conflicts.

Generally, the reset line is inactive and arbitration is begun by setting the arbitration bus 101 low (inactive) (FIG. 8). If the microprocessor 12 has not disabled the bus, the BIU looks to see if the microprocessor 12 has requested access to the SPINE bus 10. If there is no data to be sent, the BIU waits for DTR to go active and monitors the arbitration cycle by loading the bytes transmitted over the arbitration bus during the three arbitration phases into an arbitration storage register. (The arbitration storage register is temporary storage for the BIU's Last Arbritration Address Register.) Since arbitration is an asynchronous transfer, timeouts are built into the monitor scheme for clocking data into the registers after each arbitration phase.

When the CPU 12 has requested an arbitration, the status of the bus 10 is determined before active arbitration begins. If the SPINE bus is not in an idle state, the BIU waits for DTR to go high (active) before competing for the bus. If the SPINE bus is in an idle mode and DTR is low (inactive), the BIU waits 1.5 microseconds to insure arbitration is not initiated during a status cycle. If 1.5 microseconds have elapsed before the DTR line goes high (active), then the DTX line is activated. A 3.75 microsecond timer is also initiated. The 3.75 microseconds represent the length of the arbitration cycle.

Figure 5:
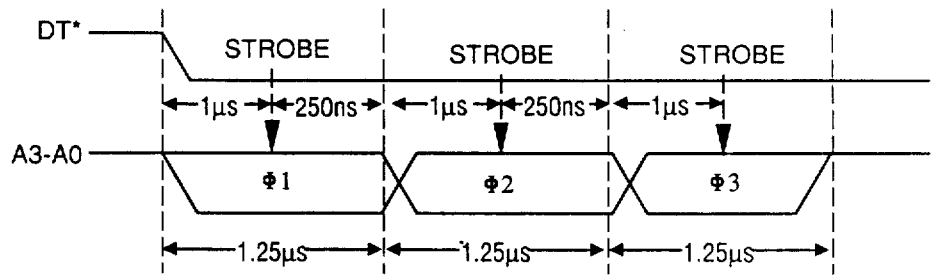
FIG. 5 is a timing diagram for the arbitration phase.
Figure 17B:
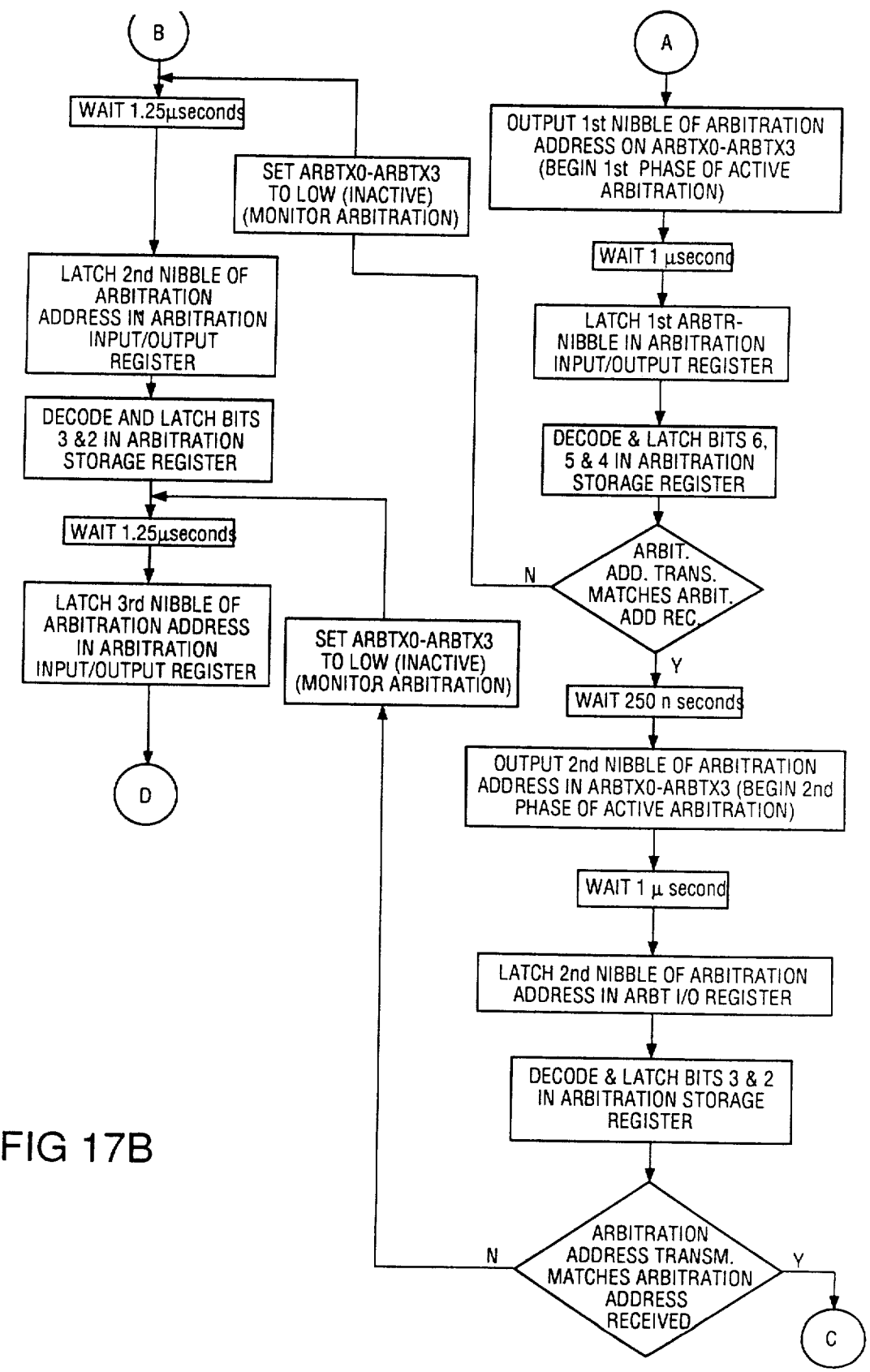
Figure 17C:
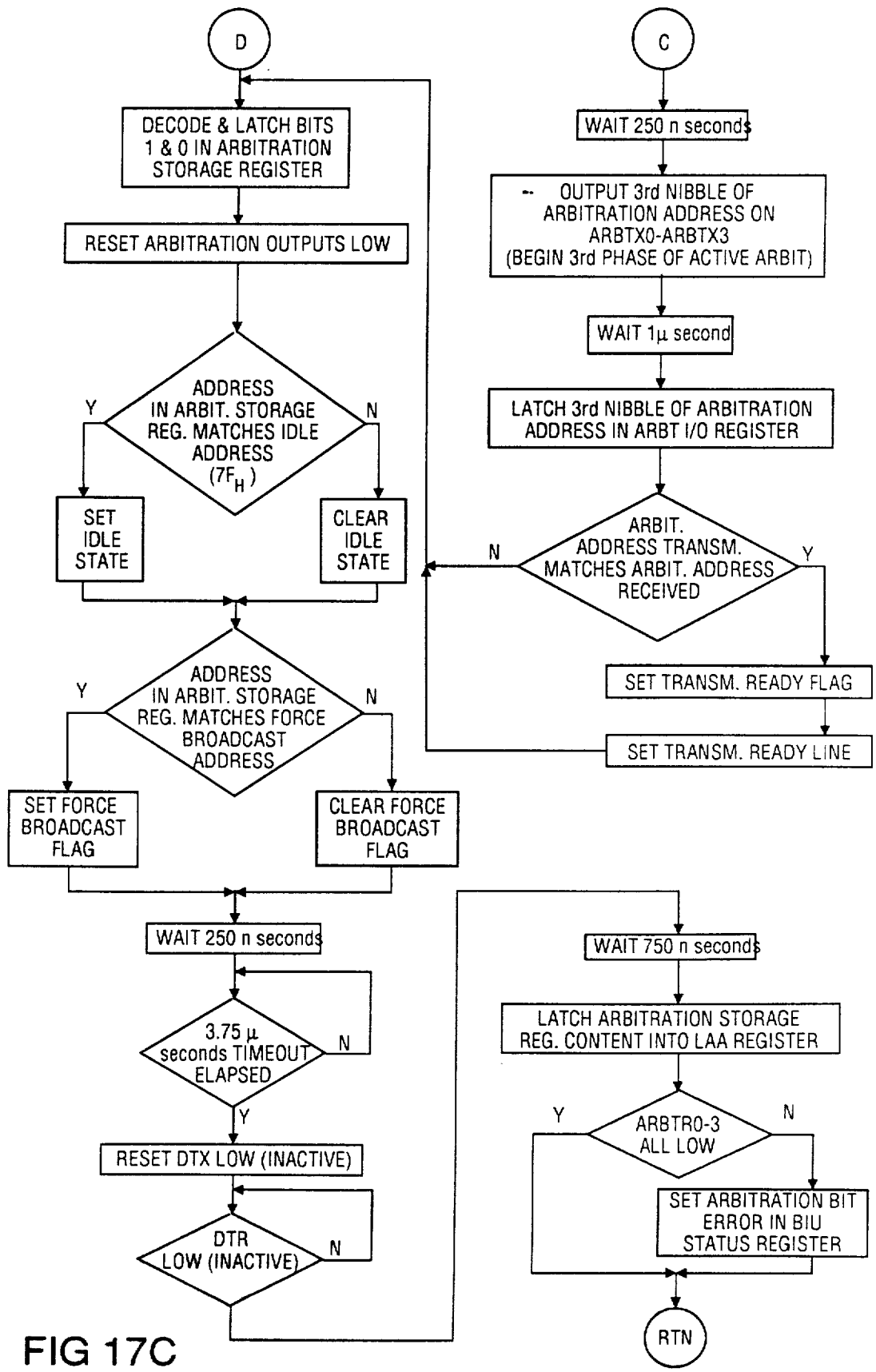
Figure 18A:
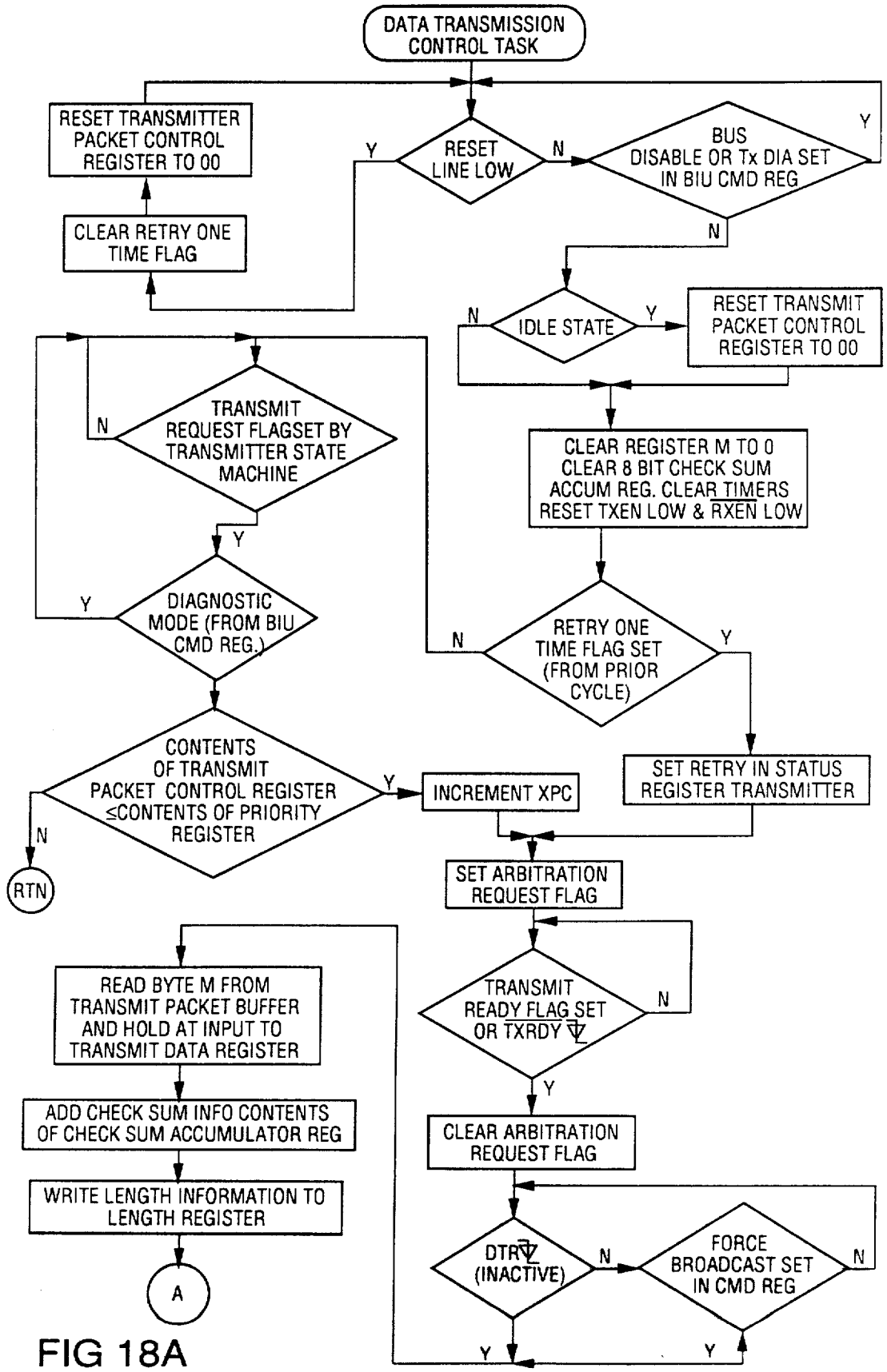
FIGS. 18A–18D are flow diagrams illustrating the general operation of transmitting data over the SPINE.
Figure 18B:
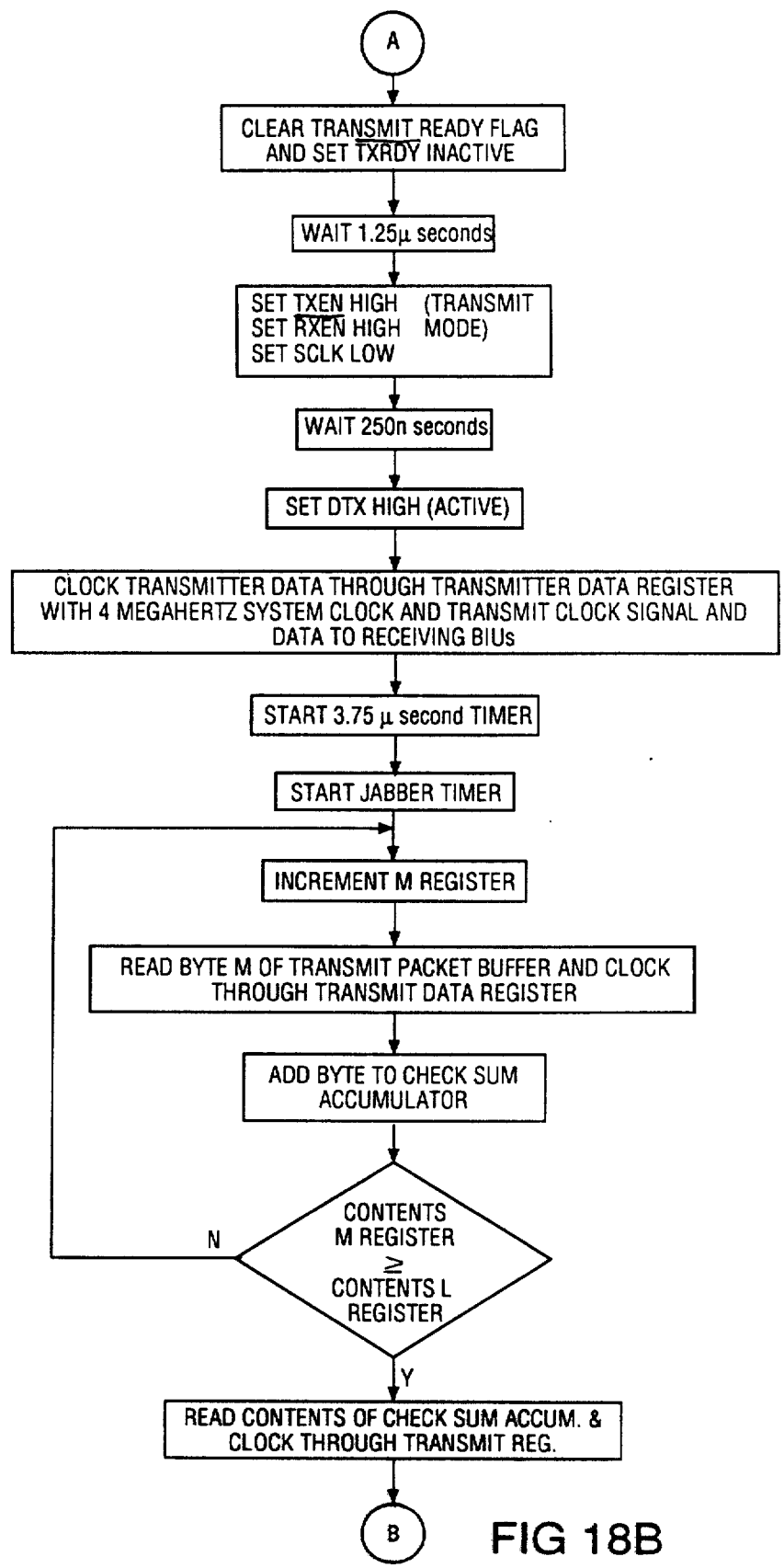
Figure 18C:
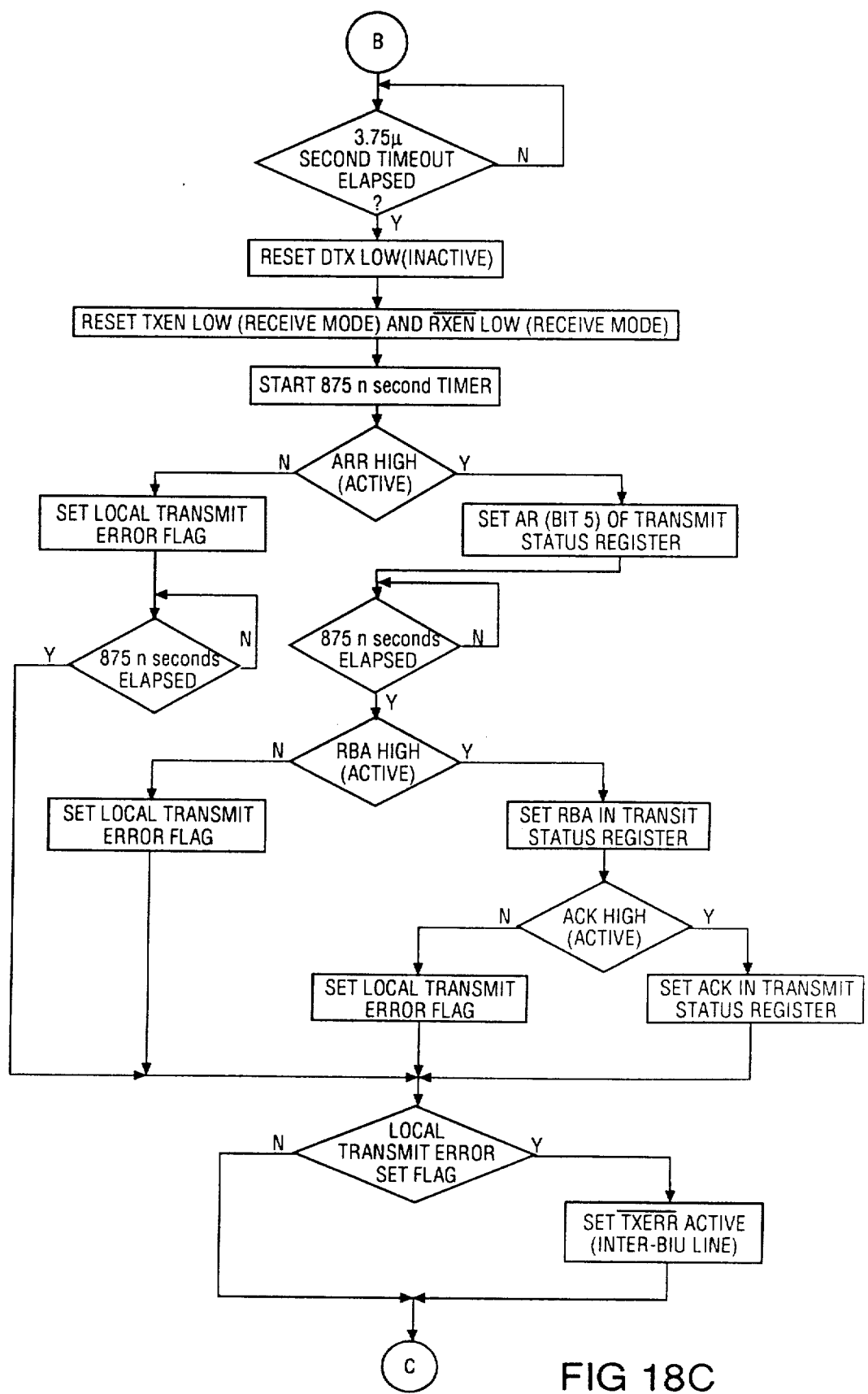
Figure 18D:
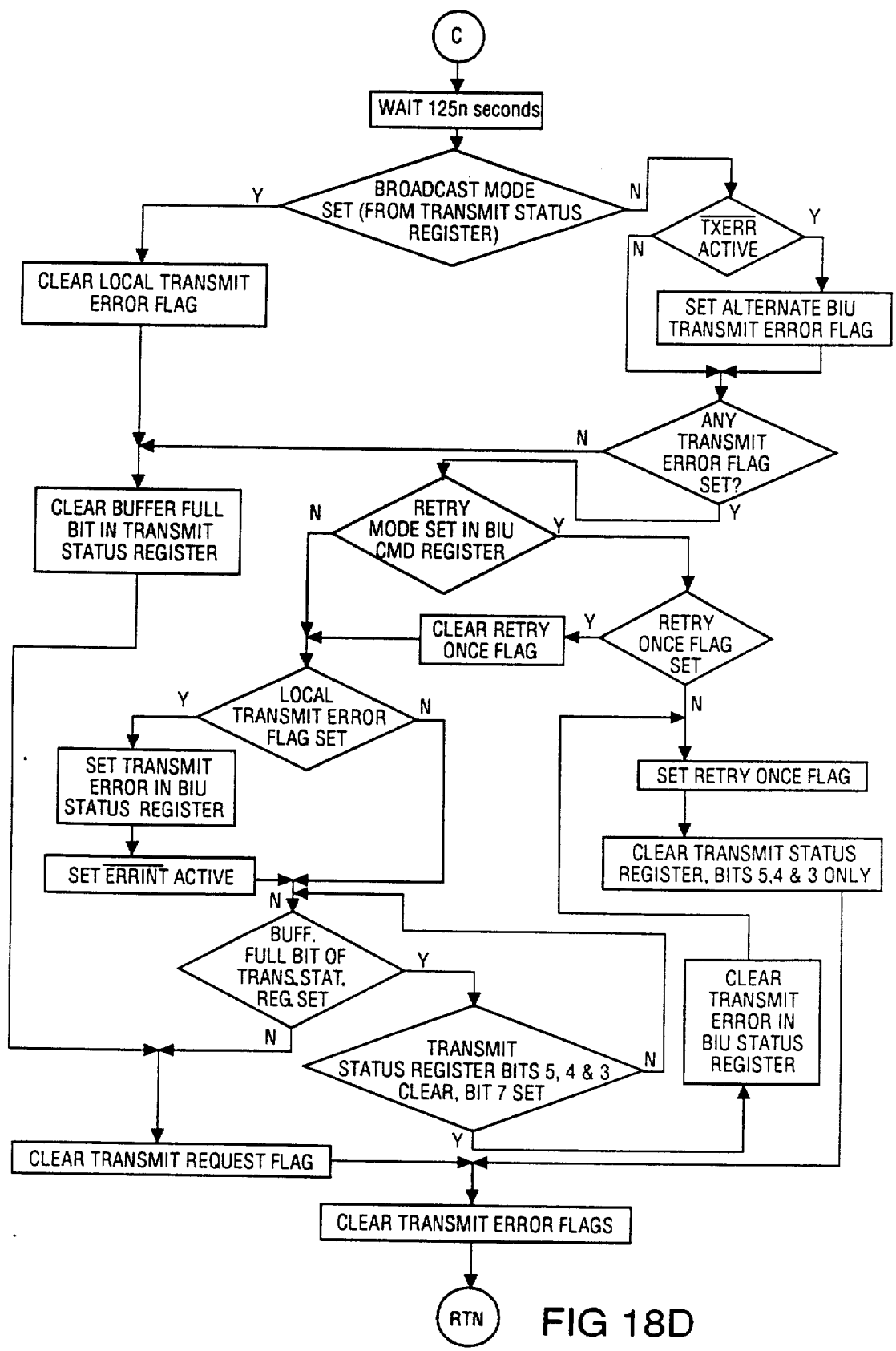

Referring to the asynchronous diagram shown in FIG. 5, and the flow diagrams shown in FIG. 17b and 17c, when DT* goes low, signaling the beginning of an arbitration phase, each contending BIU places the first nibble of address bits on the arbitration lines. After 1 microsecond each BIU samples the same arbitration lines to determine whether the address bits on the lines match the address bits previously placed on the lines. A period of 0.25 microseconds is provided for accomplishing this sampling. The same timing is used for the second and third nibbles.

Figure 14:
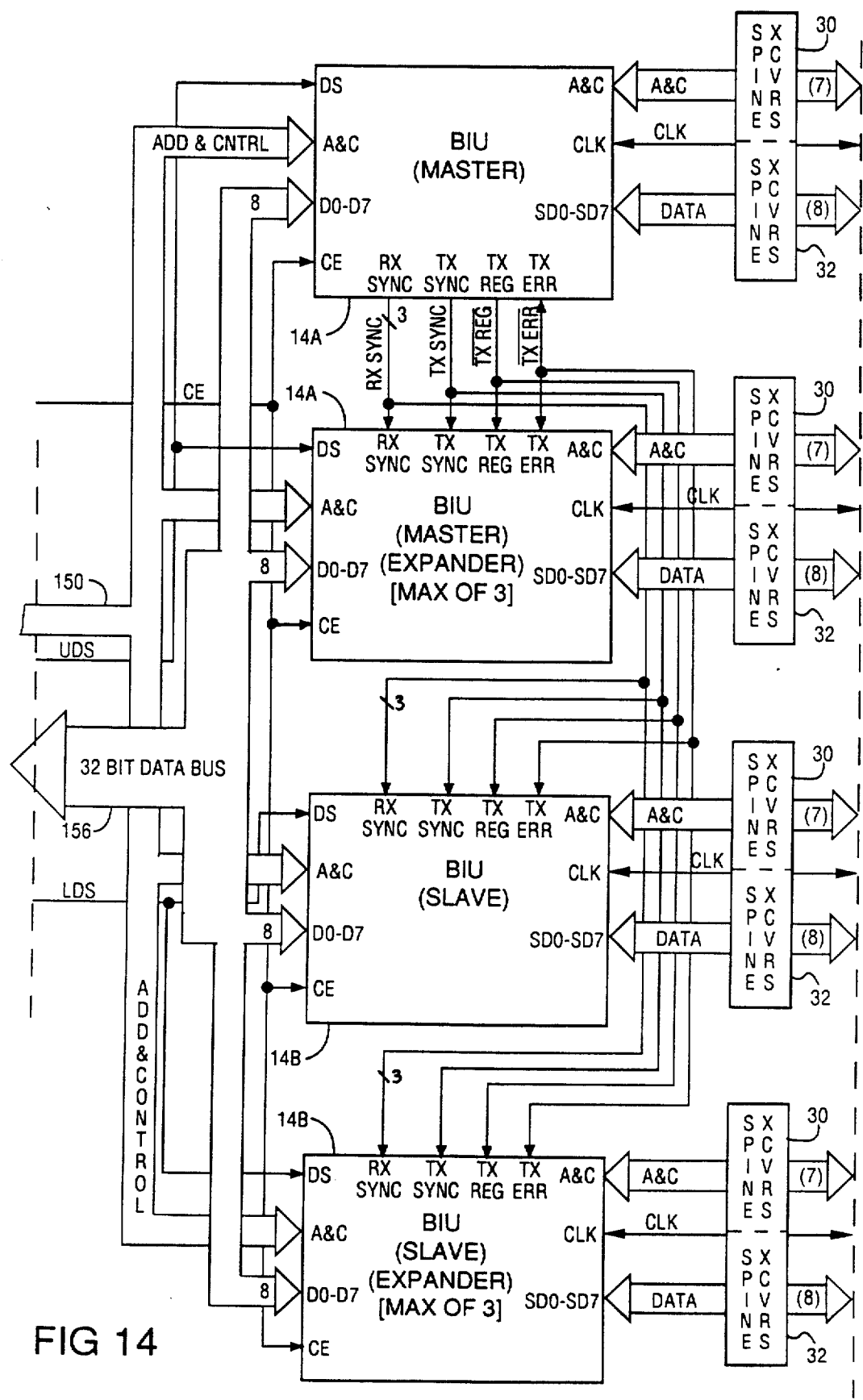
FIG. 14 is a block diagram of a network system for a 32 bits wide data bus.

If the address bits on the arbitration lines match the address bits that the BIU previously placed on the arbitration lines, the BIU remains in contention and encodes its next most significant address digit and places it on the arbitration lines. If there is a mis-match, the arbitration transmission lines are set low (inactive) and the BIU monitors the arbitration address lines for the remainder of the arbitration cycle. During the second and third phases of the arbitration cycle the BIU similarly compares the address bits on the arbitration lines with the next most significant quandry address digit of the BIU. If arbitration is won, the transmit ready flag is set and the transmit ready line (NOT TRDY) is set low. (The NOT TRDY line is shown in FIG. 14.)

After the three phases of arbitration, the address that won arbitration is compared with the idle address. If the addresses are equal, then the idle state is set. When the idle state of the SPINE occurs, no BIU pulls the DT* line low to start arbitration. If a BIU desires to send data and the bus is currently in the idle state, that BIU waits to be certain that the DT* line has been high at least 1.5 microseconds (the length of time it is normally high during the status cycle following each data cycle) to make sure that the system is not in a status cycle. The BIU then drives the DT* line low for at least 3.75 microseconds, thereby initiating arbitration. As more than one BIU might possibly desire simultaneously to initiate arbitration following an idle state, more than one BIU may simultaneously drive DT* low. This is readily accommodated, as the DT* line is wire-ORed.

The address that won arbitration is also compared with a forced broadcast address. A forced broadcast address allows a particular BIU to always win arbitration. When the 3.75 microsecond clock expires, the BIU sets DTX low (inactive). Once DTX has been set low, the BTU waits for DTR to go low (inactive) before latching the contents of the arbitration storage register into the Last Arbitration Address Register.

Data Transmission

Figure 6:
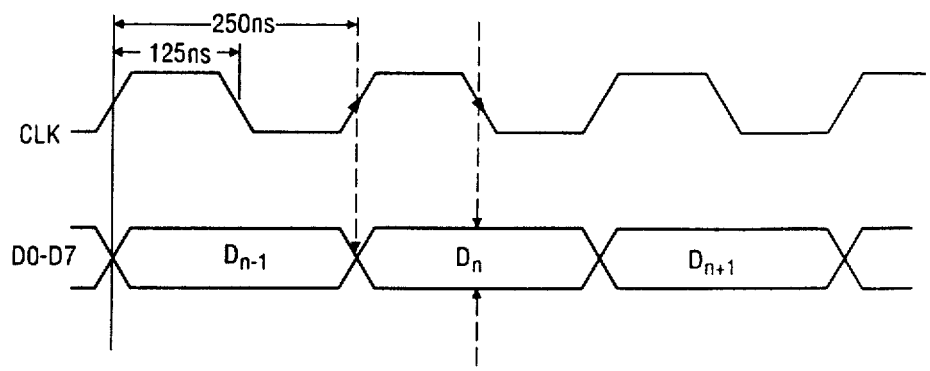
FIG. 6 is a timing diagram for data transmission.

The transmitting BIU sends its data packet, which has been stored in a packet buffer XB (FIG. 9) within the BIU prior to transmission, using synchronous baseband modulation. With each word of data, the BIU supplies a 4 meqaHertz squarewave clock, whose rising edge (low-to-high transition) is synchronized with the edge of the transmitted data, as shown in FIG. 6. The BIU uses the length byte (word zero) stored in the buffer for determining the number of words to be sent (discussed below). In addition, the BIU, on starting a data transmission, starts a 65 microsecond timer (not shown), which, if it expires prior to completion of data transmission, causes transmission to terminate and an error status to be presented to the processor. The BIU also insures that DT* is low at least 3.75 microseconds even if less time is required to send the data packet.

During the transmission of an initial portion of the data packet, the transmitting BIU calculates the one-byte-long check sum word, which is appended onto the data packet and transmitted as the last word. An add with end-around-carry is performed by each BIU to generate the check sum.

When an entire data packet has been transmitted, the transmitting BIU sets its interface circuitry for the data bus to the receive mode, to receive a status byte normally returned from the receiving BIU to the transmitting BIU during the status cycle.

If the received status byte indicates that the receiver is full, or that there was an error in reception, re-transmission of that packet may occur. Also, if AR* was not set by the receiving BIU, the last packet is retransmitted. A re-try mode is entered if either the AR*, RBA (receive buffer available), or check sum acknowledge (ACK) show that an error has occurred.

A failure to receive AR* is detected during transmission and can be used to immediately halt transmission and begin retransmission. Should the second transmission also fail, an error interrupt condition is sent to the processor serving as host (which could be connected to any BIU).

BIU Transmitter

Referring to FIG. 8, the BIU transmitter section provides its processor with two packet storage buffers 100, 102 (each 254×8 bits). Once one buffer 100, 102 has been filled, the processor writes a full message into the corresponding transmitter status register 110 or 112. The full message causes the BIU to be placed into an autonomous transmit mode in which the device places the full buffer in the active (i.e., transmitting) mode and move the other buffer to the inactive (i.e., storage) mode. Thus, during operation, the microprocessor 12 may load up one buffer, while the BIU 14 is transmitting from the other buffer. Access to the two buffers 100, 102 is alternated to allow for continuous transmission. (The buffers 100,102 and associated status registers 110, 112 are discussed in greater detail below.)

When arbitration is won by a BIU, the data receive line (DTR) is asserted, driving the open collector DT* line to an active state. The TXEN and NOT RXEN lines are set high (i.e., transmit enable) during the status cycle, after which the entire contents of the active buffer are transmitted over the SPINE data bus (see FIG. 3). During transmission of the data packet, an 8-bit checksum is calculated by BIU control logic 106. This byte is transmitted at the end of the transmitted data packet, and then DTR is inactivated. The checksum is recalculated by the receiving BIU and tested against the checksum transmitted in the data packet, to accomplish error detection The successful transmission of a data packet causes the receiving BIU to return a packet status signal to the transmitting BIU. The packet status signal provides the transmitting BIU with a measure of the success of the previous data transmission. If the receiving BIU is present and recognizes its own address within the packet header, it returns Address Recognize (AR*) over a separate SPINE open-collector status line during normal data transmission If the receiving BIU activates AR* within a predetermined timespan, the transmitting BIU's control logic 106 sets an address recognized (AR) bit in the active transmitter status register 110 or 112.

At the end of data transmission, the DT* line returns to the inactive state and the transmitting BIU places the SPINE data XCVRs in the receive mode. The receiving BIU then puts its transceivers 30 and 32 in the transmit mode and places the remaining two status bits BE* and AR* on the SPINE control and arbitration bus 22 or 24. If an empty receiver packet buffer 134 (FIG. 10) was available for the previous packet, a receive buffer available signal (RBA) is asserted on line SD0 of the SPINE data bus 16. If the transmitted checksum matches the receiver's calculated checksum, an acknowledge signal (ACK) is asserted on line SD1. If the receiving BIU activates RBA or ACK within a predetermined timespan, the transmitting BIU's control logic 106 sets an RBA bit and an ACK bit, respectively, in the active transmitter status register 110 or 112. Packet status information is returned asynchronously, so that the BIU that transmitted the packet is required to use the negative edge of DTR (active to inactive) to synchronize the status byte. The node strobes the status byte into the appropriate transmitter status register 875 nanoseconds after DTR goes low, and DTR will remain low for at least 1.5 microseconds.

In response to a successful data packet transmission a transmitter state machine 116 will reset the buffer full bit in the inactive transmitter register 110 or 112 to empty. The transmitter state machine 116 will also switch one of the transmitter status registers 110, 112 and one of the transmit packet buffers 100, 102 from the active state to the inactive state, and will switch the other pair from the inactive state to the active state. If an empty transmitter packet buffer is present, a transmitter interrupt pending bit is set in the interrupt status register, and the NOT TXINT line is asserted (unless it is masked), to indicate to the processor 12 that the BIU is ready to accept new data.

If the data transmission is unsuccessful, the buffer full bit is not reset and the active and inactive transmitter packet buffers 100, 102 and transmitter status registers 110, 112 are not alternated. Instead, an error interrupt signal is set in the inactive transmitter status register 110 or 112, the transmit error bit in the BIU status register 110 or 112 is set, and the NOT ERRINT line is asserted (unless it is masked). This interrupt signal alerts the processor that the last data packet was not successfully transmitted and that that packet is still in the active transmitter packet buffer 100 or 102 waiting to be transmitted. At this point the processor may attempt to re-transmit the packet or throw it away at its own discretion, by resetting the active transmitter status register 110 or 112 appropriately. No status is returned for monitor or broadcast packets.

An alternative to this operation can be programmed into the BIU by setting a retry bit in the BIU command register. When the BIU is in the retry mode, whenever the proper data packet status is not returned by the receiving BIU, an automatic retry is attempted. The BIU arbitrates for the SPINE data bus, starting with the next bus cycle, and when it wins the bus, it retransmits the same data packet which was unsuccessfully attempted on the first try. The resulting transmit status of the second try replaces that of the first try, and the retry bit is set in the active transmitter status register 110 or 112. The BIU now proceeds as it does when it is not in the retry mode, interrupting the processor with NOT TXINT or NOT ERRINT as appropriate. Preferably, retry only occurs once, for each unsuccessful normal data transmission.

The flow diagrams of FIGS. 18A-18D provide a detailed description of the function of each BIU transmitter.

Arbitration is initiated by examining the state of the data bus (assuming that the microprocessor is not in a reset mode and that the data bus is not disabled or that diagnostics are not being performed). If the bus is not in an idle state, then status registers used to keep track of the number of packets to be transmitted (Register M and the check sum accumulator register) are cleared. Timers, which are used for jabber and making sure that the transmitter state machine 116 does not get hung up, are also cleared. Lines TXEN and NOT RXEN are also reset, so that the BIU may receive information over the data bus 16. (See FIG. 3.) If the data bus is in an idle state, then a transmit packet control register (XPC) which is used to count the number of times data has been transmitted by the BIU during a bus cycle is reset. The contents of the XPC are then compared with the contents of a priority register, which designates how many times during a data cycle the BIU can transmit data.

Once the registers and timers have been cleared, a determination is made whether the system is in a retry mode. The system, when in the retry mode, provides for retransmission of a data packet should a first attempt fail. During retransmission, the microprocessor 12 is not affected by random bit errors that may occur during the first transmission. The receiving BIU informs the transmitting BIU of the status of the transmission during the status cycle. If the BIU is in the retry mode, a retry bit is set in the appropriate transmit status register 110 or 112, and an arbitration request flag is set.

Normally the transmission is in a first-try mode and the transmit request flag is set by the transmit buffer control state machine 116 (discussed below). If the BIU is not in a diagnostic mode and if the BIU is not expected to transmit data during a current bus cycle, the Transmit Packet Control Register is incremented, and the arbitration request flag is set. Once the arbitration request flag has been set, the BIU waits for a transmit ready flag to be set, or for NOT TXRDY to go low. (NOT TXRDY, shown in FIG. 14, indicates whether the BIU has won arbitration.) When the transmit ready flag is set, or when NOT TXRDY goes low, the arbitration register flag is cleared and the BIU waits for the data transfer line, DTR, to go low (inactive). In other words, the system is waiting for the beginning of the status cycle shown in the data timing diagram of FIG. 2. The DTR line will drop low upon termination of data transmitted by another node. Once the DTR line goes low, one byte of the data packet is transferred to the transmit data register 120 (FIG. 8). The check sum accumulator register is then updated, and the length of the data packet is written into a length field register L. The transmit ready flag is then cleared and the NOT TXRDY line of the BIU interface is set inactive. The BIU then waits 1.25 microseconds to ensure that the BIU is in the middle of the status cycle before the BIU sets transmit enable (TXEN), receive enable (NOT RXEN), and transmit clock (SCLK). After these lines are set, the BIU waits 250 nanoseconds to ensure that the status cycle is complete before the BIU sets the data transmission line, DTX, high, thereby driving the DT* line low. By setting the DT* line low, the BIU directs all other nodes that are waiting to arbitrate to start their arbitration schemes, and to start receiving data which is clocked out of the transmit data register 120 by a 4 megahertz system clock SCLK. Upon the initial transmission of data, a 3.75 microsecond arbitration timer and a jabber timer are initiated.

The contents of the length field register L are compared to the contents of register M, which is incremented for each byte transmitted through the transmit data register and over the SPINE bus. When the contents of M equal the contents of L, the contents of the check sum accumulation register, ACCM, are clocked out of the transmit data register 120. When the transmission of data is complete, the BIU waits, if necessary, until 3.75 microseconds have elapsed since the setting of the arbitration timer. The 3.75 microseconds represent the minimum data cycle length, since it is the time required to complete arbitration. The BIU then resets the data transmission line, DTX, low (inactive mode), transmission enable, TXEN, low (receive mode), and receive enable, NOT RXEN, low (receive mode). An 875 nanosecond timer is initiated as a watchdog for ensuring that the receiver receives an address recognize signal, ARR. The address recognize signal is transmitted on a dedicated line separate from the data bus 16. Data can be truncated onto a single 8-bit-wide data bus if the address is not recognized by the receiving BIU. The address recognize signal tells the transmitter whether the packet is successfully being transmitted or whether a failure has occurred. If the address recognize signal is received before the 875 nanoseconds have elapsed, then the address recognize bit AR, is set in the transmit status register. At the completion of the data cycle, the receiver transmits over the data bus, on lines SD0 and SD1, the status of the transmission. If a receive buffer receives the data and if the check sum accumulated at the receiver matches the check sum byte transmitted, then the receive buffer available bit (RBA) and the acknowledge bit (ACK), are set in the transmit status register. If one of these three signals is not received by the transmitting BIU, a local transmit error flag is set. If a local transmit error flag is set, the transmit error line, NOT TXERR is set activate. (NOT TXERR is shown in FIG. 14.)

At this point, a determination is made whether the broadcast mode has been set. If the transmission is in a broadcast mode, then the transmit error flag, NOT TXERR, the buffer full bit in the transmit status register, the transmit register flag, and the transmit error flags are cleared, and the BIU returns to the beginning of the flow chart.

If the broadcast mode has not been set, and the transmit error line NOT TXERR is active, then the alternate BIU transmit error flag is set. If there are no transmission error flags set, the BIU clears the buffer full bit in the status register, the transmit register flag, and the transmit error flag, and the BIU returns to the beginning of the flow chart.

If transmit error flags are set (either local errors or arbitration errors), and the retry mode bit is not set in the BIU's second command register, and the local transmit error flags and the full buffer bit of the transmit status register are not set, then the clear transmit register flag and the clear transmit error flags are cleared. If a local transmit error flag has been set, then the transmit error flag is set in the BIU status register, and NOT ERRINT is set before the BIU clears the transmit register flag and the transmit error flags. If bits 3, 4 and 5 (Acknowledge, Receive Buffer Available, and Address Recognized, respectively) are cleared with bit 7 (Buffer Full) being set in the transmit status register, then the BIU waits until the buffer is emptied. If bits 3, 4 and 5 are not cleared or if bit 7 is not set, the transmit error bit in the BIU status register is cleared and the retry flag is set. The bits 3, 4 and 5 in the transmit status register are then cleared, as are the transmit error flags.

Transmit Packet Buffers and Status Registers

Referring to FIG. 8, the BIU has two transmit buffers 100 and 102 and each buffer has an associated status register 110 and 112. These buffers can be read from and written into addresses $200_H$ through $2FD_H$ and $300_H$ through $3FD_H$ (hexadecimal), respectively, and the associated status register can be read from and written into at $100_H$ and $101_H$ (hexadecimal), respectively, when the system is in a diagnostic mode. After reset, when the BIU is in the normal mode and not the diagnostic mode, the transmitter packet buffer 100 or 102 and the transmitter status register 110 or 112 are accessed (written into) at $200_H$ through $2FD_H$, and $100_H$, respectively. The addresses $200_H$ through $2FD_H$ are associated with the inactive transmitter packet buffer (Tx Pkt Buff [I]) and are used for storage of the data packet about to be transmitted. All status information associated with the Tx Pkt Buffer [I] resides in the inactive transmitter status register at $100_H$. The active transmitter packet buffer and its associated active transmitter status register are associated with the addresses $300_H$ through $3FD_H$, and $101_H$, respectively, and are the buffer and status register used by the BIU for ongoing data transmission This buffer is not accessable to the host processor unless the BIU is in the diagnostic mode.

The transmitter state machine 116 controls, via transmitter buffer control lines 118, which buffer 100 or 102 is active or inactive, and which register 110 or 112 is active or inactive. When a transmitter packet buffer 100 or 102 is filled and is in the active mode, the buffer is sequentially read out (starting with the length byte L) until all the data stored in it has been clocked (byte-wide, serial) through a transmitter data register 120 by means of a transmitter clock signal 122 (4 MHz). The BIU control logic 106 then updates the status of the active transmitter status register. If the data transfer is successful, and the inactive transmitter package buffer is full, the transmitter state machine 116 switches the active register 110 or 112 and the active buffer 100 or 102 to inactive, and switches the inactive register 110 or 112 and the inactive buffer 100 or 102 to active. The BIU then starts arbitrating for the SPINE bus again. The host processor will always load at the same transmitter packet buffer addresses ($200_H$–$2FD_H$) for all transmissions.

Every time the transmitter state machine 116 switches the active/inactive status of the two transmitter buffers 100 and 102 (and status registers 110 and 112) the transmitter state machine 116 sends a transmitter interrupt signal (NOT TXINT) to the host processor (unless the signal is masked) and sets the transmitter interrupt pending bit in the interrupt status register. The NOT TXINT signal indicates to the host processor that an empty buffer is ready to be filled. The clearing of the interrupt pending bit causes the NOT TXINT line to be reset. The inactive transmitter buffer and transmitter status register remain inactive until the buffer full bit is set in the transmitter status register 110 or 112, and the other transmitter packet buffer becomes empty.

Transmitter State Machine

The transmitter state machine (XSM) 116 is a state machine that controls the mode of the transmitter packet buffers 100 and 102 and transmitter status registers 110 and 112 (active or inactive), the read/write timing for the transmitter packet buffers 100 and 102, the data transmission operational flow, the jabber time-out task (64 μsec timer), and other related transmit tasks. The state machine requires interfaces with the transmit packet buffers and the BIU control logic 106, which contains the individual command, status and special purpose registers.

Reception

All BIUs monitor the second word, the destination address DA, of each transmitted data packet. If a particular BIU determines that this destination address is in fact its own physical address (which it stores in its packet address register), the broadcast address (hexadecimal FF), or the force broadcast address (hexadecimal 00), and the BIU has an empty data packet buffer, the BIU stores each word transmitted, including the length L, destination-address DA, source-address SA, and check sum CS words, in the receiving buffer 134 (FIG. 10). In addition, if the destination address is the same as that BIU s physical address, that BIU drives the address receive line, AR* high until the transmission ends. If the addressed BIU has an empty data packet buffer, it sets the receive buffer available bit, RBA high in the data packet status byte transmitted in the status cycle following the data cycle. The receiving BIU also sets aside an accumulator for the purpose of forming the sum of every byte (except the check sum byte). The result of that addition is compared to the received check sum byte, and the acknowledge bit, ACK (returned to the transmitting BIU during the status cycle) is set high if the two sums match. In a limited monitor or broadcast transmission, the AR*, RBA, and ACK signals are not sent.

The receiving BIU uses the data clock (DC) transmitted by the transmitting BIU to time sampling of data on the data bus. The falling edge of the clock (high-to-low transition), which occurs approximately 125 nanoseconds after the start of transmission of each data byte (midway through the 250 nanosecond transmission time for each byte), initiates sampling of a data byte by a receiving BIU. The data should appear on the data bus lines at least 20 nanoseconds before the negative clock edge and at least 50 nanoseconds thereafter, to insure accurate reception of data.

Data transfer cycles are recognized at a receiving BIU by monitoring the DT* for a falling edge. DT* is low during the entire reception of a data packet. When DT* returns high, the receiving BIU turns its data bus interface circuitry around in order to transmit the RBA and ACK two-byte status word back to the transmitting BIU.

Receiver Section

Referring to FIG. 10, the receiver section of the BIU monitors the SPINE data bus 16 for all data packets that contain that BIUs packet address in the packet destination address (DA, 2nd byte), or that contain the broadcast or forcebroadcast address ($FF_H$ or $00_H$) When the BIU is in the limited monitor mode, the BIU monitors the data bus 16 for any data packet that the BIU has room to store. Once a valid data packet is recognized, the receiver section stores it in one of the receiver packet buffers 134 (if any are available) and returns packet status information to the transmitting node (discussed in detail below). The receiver section also interrupts the host processor whenever the newly received data is available to be read.

To perform this task, the BIU control logic 106 monitors the DTR line for a positive transition (DT active). When DTR is asserted, it indicates that a new SPINE bus cycle has started and a receiver state machine (or RSM) 130 enters a mode in which it clocks the received data packet through the two receiver data registers 132, by means a receiver data clock SCLK, and reads the first and second bytes of the packet. The first byte (the length byte, L) is latched in a byte length register L (not shown) and the second byte is latched in the destination address register (not shown). The receiver state machine 130 loads the received packet into an active receiver packet buffer 134, and calculates its checksum. If all receiver packet buffers 134 are full, the receiver state machine 130 simply dumps the packet as it is being clocked into the BIU, saving the L and DA bytes. When the receiver state machine 130 has counted L data bytes of the packet, it has arrived at the checksum byte, CS, which it compares with the checksum in the checksum accumulator in the BIU control logic 106. This last byte is also stored in the active receiver buffer 134, followed by the last arbitration address register byte (LAAR). As soon as the destination address, DA, is latched into the destination address register, DAR, the contents of the destination address are compared to the contents of the packet address register, to determine whether the packet is addressed to that particular SPINE node. If the address matches, the BIU control logic 106 asserts the Address Recognized transmitter line ARX, which is returned to the transmitting node as packet status information. (See FIG. 3.) If the address is not a match, the destination address is compared with the broadcast address (FF$_H$). If the addresses match, the broadcast bit is set in the active receiver status register 136 by the receiver state machine 130. If the addresses do not match, the destination address is compared with the forced broadcast address. If the addresses match, the forced broadcast packet bit is set in the active receiver status register 136. No packet status information is returned by the receiving BIU for broadcast, forced broadcast, or monitor packets. The data packet is always saved in the receiver packet buffer 134.

Following a completed transfer of a data packet, the DTR line will go low (inactive), indicating that the transmission is completed and that the transmitting BIU is waiting for the the packet status information to be returned from the receiving BIU. If DTR does not go low within 64 milliseconds (the maximum time duration of a packet transmission), a bus cycle error bit is set in the active receive status buffer 136, and a DT cycle error bit is set in the BIU status register. If after the DTR line goes low, it remains low for longer than 1.5 microseconds (except during an idle cycle), only the DT cycle error bit of the BIU status register is set. Also, if at any time during data packet reception, the SCLK signal should fail to make a transition within 250+nanoseconds, the loss of data clock error bit will be set in the BIU status register. All error bits set in the BIU status register cause an error interrupt (NOT ERRINT) unless the NOT ERRINT signal is masked.

When the DTR line has returned high, the BIU control logic 106 sets TXEN and NOT RXEN high (transmit mode). If a receiver packet buffer 134 is available and the packet is successfully loaded, the BIU control logic 106 asserts the receive buffer available bit (RBA-)on line SDO of the transmit data bus 137.

If the received checksum matches the checksum calculated by the BIU control logic 106 as the data packet is received, then the BIU control logic also asserts the acknowledge bit (ACK) on line SD1 of the transmit data bus 137. If the calculated checksum does not match the received checksum, ACK is not asserted and a faulty packet bit is set in the active receive status register 136. Both ACK and RBA are clocked through a transmit data register 138 and onto the SPINE data bus 16 by means of the clock signal SCLK. At the end of the status cycle (1.5 microseconds after the end of data cycle), the BIU control logic 106 looks for DTR to go high again. The packet status bits are valid for a minimum of 750 nanoseconds following the negative transition of DTR.

All data packets are received and stored in the active receive packet buffer 134 until the end the current bus cycle, regardless of whether there is a checksum error. If a limited monitor bit is set in the BIU command register, the node operates in a "promiscuous" mode, in which the BIU receives and saves all data packets that are transmitted on the SPINE data bus as long as there are receive packet buffers available. As when the system is in the broadcast mode, no packet status information is returned by the receive node, and all packets are stored regardless of whether any checksum errors occur.

At the end of each bus cycle (i.e., the data and status cycles) the receiver state machine 130 sets the buffer full bit in the active receive status register 136 only if the associated active receive packet buffer contains a valid data packet. A data packet is valid if it is addressed to the receiving node, if the data packet is a broadcast packet or a forced broadcast packet, or if the node is in limited monitor mode). Once the buffer full bit is set, the receiver state machine 130 switches the active buffer 134 and status register 136 to inactive and switches the next available receive packet buffer 134 and its associated receive status register 136 from inactive to active. Non-valid data packets do not cause the buffer full bit to be set. Thus, the active and inactive buffer and status registers are not alternated by the receiver state machine 130, and the next data packet that is received by the BIU is written over the old data packet, and the new status information is written over the old status information.

Receive Packet Buffers and Status Registers

There are eight (256×8 bit) receiver packet buffers (Rx Pkt Buffers) 134 and eight receiver status registers (Rec Status Reg) 136 in each BIU receiver section. These eight buffers and eight registers perform three different fuctions; data loading, data storage, and data unloading, under the control of the receiver state machine 130. All buffers and registers are written into and read from in the diagnostic mode and are addressed at 500 through 507H (hexadecimal) for the receiver status registers 136, and at 800$_H$ through FFF$_H$ for the receiver packet buffers 134 In normal operation, the receiver state machine 130 controls the address field so that the current receiver packet buffer resides at addresses 800$_H$ through 8FF$_H$, and the current receiver status register resides at address 500$_H$. The addresses of the current buffer and the current status register are the addresses at which the host processor reads the packet data and the status information from the BIU. All other buffers and status registers are used by the BIU for loading or storing data. The receiver packet buffers 134 and status registers 136 are designated as active or inactive by the receiver state machine 130 and are used in a "circular buffer" fashion. Receiver packet buffers 0 through 7 (located at addresses 800$_H$ through 9FF$_H$, and E00$_H$ through FFF$_H$, respectively) are controlled by receiver pointer register (RP) and a current receiver buffer pointer register (CP), as are the receiver status registers 0 through 7 located at addresses 500$_H$ through 507$_H$).

After the reset procedure, the receiver state machine 130 sets receiver packet buffer 0 and receiver status register 0 active by setting the contents of the receiver pointer register RP equal to zero. The receiver pointer register always points to the active buffer, i.e., the buffer (and status register) that will be used to load the received packet data from the SPINE bus. A current receiver buffer pointer register (CP) is reset to 7. Thus, the current buffer and status register are receiver packet buffer 7 and status register 7. The CP always points to the buffer and status register being unloaded by the host processor. The current buffer and status register are both inactive. Therefore, the current buffer and status register never interfere with the loading of SPINE data. Whenever a receiver packet buffer 134 becomes full and is moved to the current buffer address (800$_H$ through 8FF$_H$), the BIU control logic 106 generates a receive interrupt which sets the RXINT line low and sets the RXINT pending bit in the inactive transmitter status register 110 or 112. As each new receiver packet buffer becomes full and current, a new interrupt is generated. Clearing the inactive transmitter status register interrupt pending bit resets the interrupt line unless a second interrupt is pending. The current receiver packet buffer and status register remain current until the buffer full bit in the receiver status register 136 is cleared and a new buffer becomes full.

A receive packet buffer queue (RPBQ) register maintains a continuous indication of the number of receiver packet buffers 134 that are still empty The contents of the receiver packet buffer queue register are read by the host processor at address $600_H$.

Figure 13:
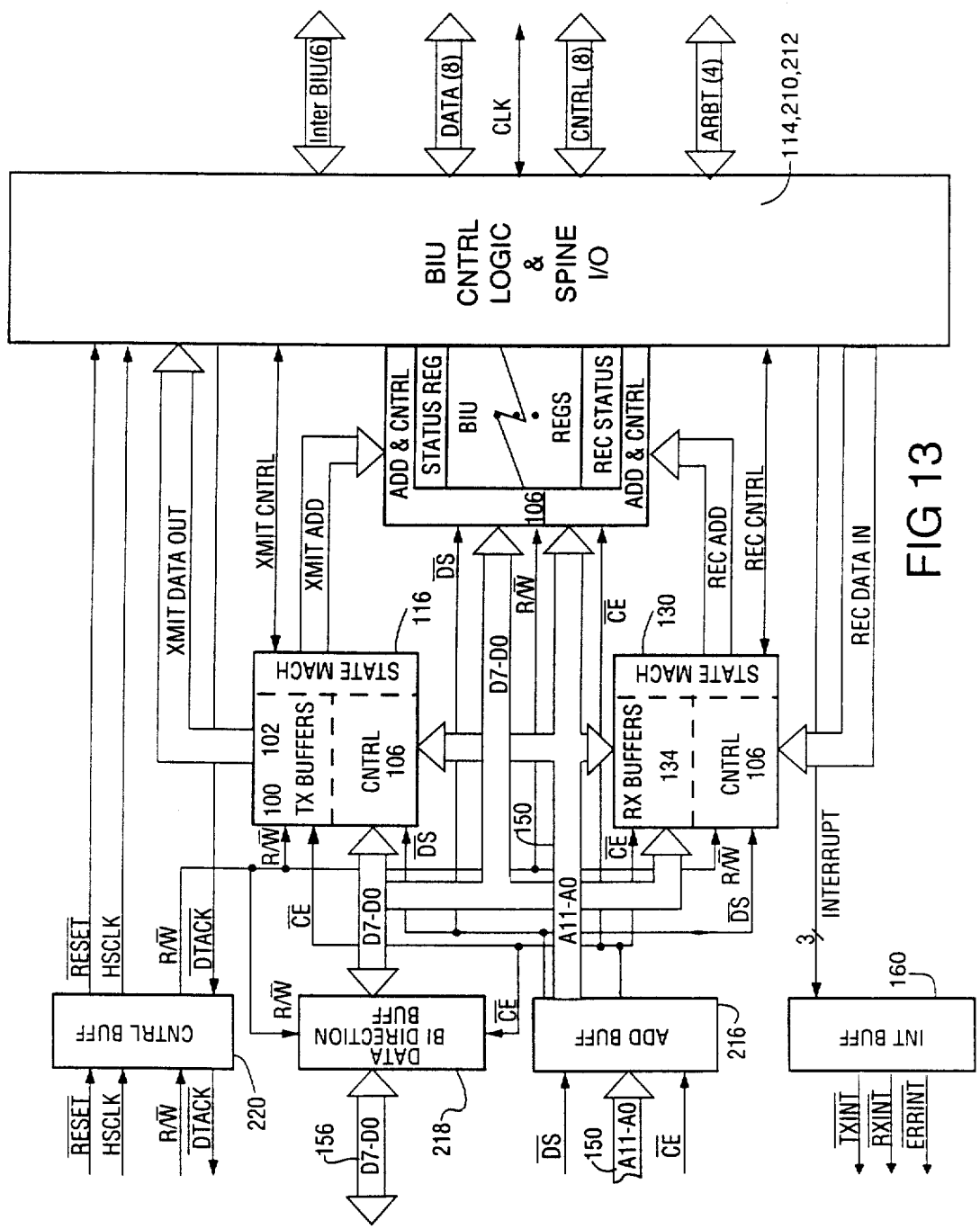
FIG. 13 is a block diagram of the BIU host interface section.

Whenever the receiver state machine's loading of the receiver packet buffer 134 and status register 136 comes into conflict with the host processor's use of these buffers and registers (e.q., on account of timing race condition that exists between the host and the BIU), the BIU will be given priority over the processor and the host processor will be forced into a wait state by means of the processor input/output DTACK line. (The DTACK line is shown in FIG. 13.) The timing of this interface is discussed below.

The receive state machine (RSM) 130 is a state machine that controls the allocation of the receiver packet buffers 134 and the status registers 136, the read/write timing of the receiver packet buffer 134, the data reception operational flow, the receiver packet buffer queue register, the receiver error detection, and other related receiver tasks. The receiver state machine 130 requires an interface with the receiver packet buffers 134 and the BIU control logic 106, which contains the command registers, status registers, and special purpose registers.

To facilitate an understanding of the receiver state machine, attention is directed to the operational flow diagrams in FIGS. 11A–11D. If the BIU is not in a reset mode, if the SPINE bus is not disabled, and if diagnostics are not being performed, the BIU is conditioned for receiving data by the clearing of the check sum accumulator register (ACCM), the receive data register, and the no status flag in the active receiver status register 136. A counter (M) used to count bytes as they are received by the node is set to zero. The transmit enable TXEN and the receive enable NOT RXEN which, are both bi-directional signals, are set low (receive mode). Once the BIU is in the receive mode, it waits for the DTR line to go from inactive to active indicating the end of a status cycle period. After the status cycle, the first byte of the data packet is clocked into the receive data registers 132 with the 4k hertz clock signal (SCLK), and then loaded into the byte length register (BLR). After the first byte is loaded, the second byte of the transmitted packet is loaded into the receive data registers 132 by means of the SCLK signal, and then loaded into the destination address register (DAR). If the contents of the destination address register equal a forced broadcast address, then the forced broadcast packet bit is set in the receiver status register 136, and a no status flag is set The no status flag indicates to the BIU whether status information is to be sent back to the transmitting node. Alternatively, if the destination address equals the address of that particular receiving node, then the address recognize line, ARX, is set high. ARX is the status line that is sent back to the transmitter over the SPINE bus in the status cycle. If the contents of the data address register are not equal to the address of the receiving node, then the address is checked against a broadcast mode address. If the address is a broadcast mode address, then the no status flag is set and the broadcast message bit, is set in the active receiver status register 136. If the address is not a broadcast mode address, it is further tested against a limited monitor mode which is a mode address. The limited monitor mode is a mode address The limited monitor mode allows a node to be used as a data analyzer. If the address is not a limited monitor mode address, the BIU returns to the initial state as indicated by the flow chart. If the system is in the limited monitor mode, the no status flag is set.

A status signal, which indicates that the address was recognized, is transmitted back to the transmitor on a line separate from the data bus 16. The address recognize signal travels on a dedicated line that runs throughout the network. The data transmitted on the data bus 16 can be truncated onto a single eight bit wide bus if the address is not recognized within a few cycles after the transmission of the data.

Once the address is recognized by the receiving node and the proper registers have been set, the BIU determines whether the active receive status register buffer is full. If a receiver packet buffer is available as indicated by the receiver pointer (RP), the receive buffer available (RBA) flag is set, and the data packet is loaded into the receiver packet buffer 134. RP is the pointer that is used in the state machine discussed below. The contents of the length field register L are compared to the contents of register M, which is incrememted for each byte of data received. The current contents of register M are also added to the contents of the check sum accumulator register, ACCM. When the contents of the length field register L equal the contents of the counter M, indicating that the whole packet is in the buffer 134, the accumulated check sum (CS) is loaded into the buffer. The contents of the last arbitration add register LAAR are then appended to the buffer. The LAAR contains the arbitration address found on the arbitration bus 22 when data was received. Thus, the receiving node has some indication, other than the source address 5A, of which node transmitted the packet. The LAAR is used for indicating that the arbitration mechanism is working.

If the DTR signal goes low (inactive), indicating the beginning of a status cycle, status information is sent back to the transmitter. The status information indicates whether the RBA flag was set and whether the check sum that is transmitted equals the accumulated check sum at the receiver. The status information is transmitted over the data bus 16 on the lines SD0 and SD1, and on the line AR*. The transmittor gets three status bits back from the receiver. The first bit indicates that the receiving BIU recognizes the address of the packet. The second bit indicates that a buffer is available and the third bit indicates that the check sum and the accumulated check sum are equal.

The clock SCLK is set low before a determination is made whether the no status flag has been set. If there are no flags set then the transmit enable, TXEN, and the receive enable, NOT RXEN, are set for enabling transmission. The data to be transmitted is then strobed into the transmit data register 138.

After the data to be transmitted is strobed into the transmit data register 138, or if no status byte is returned to the transmit node, a 750 nanosecond timer is initiated. The accumulated checksum and the length byte are strobed into the receiver packet buffer 134. After the 750 nanoseconds have elapsed, the transmit and receive lines TXEN and NOT RXEN are set, placing the BIU in the transmit mode for transmitting the status bits back to the transmitting node.

Receiver Error Detection Task

Figure 12:
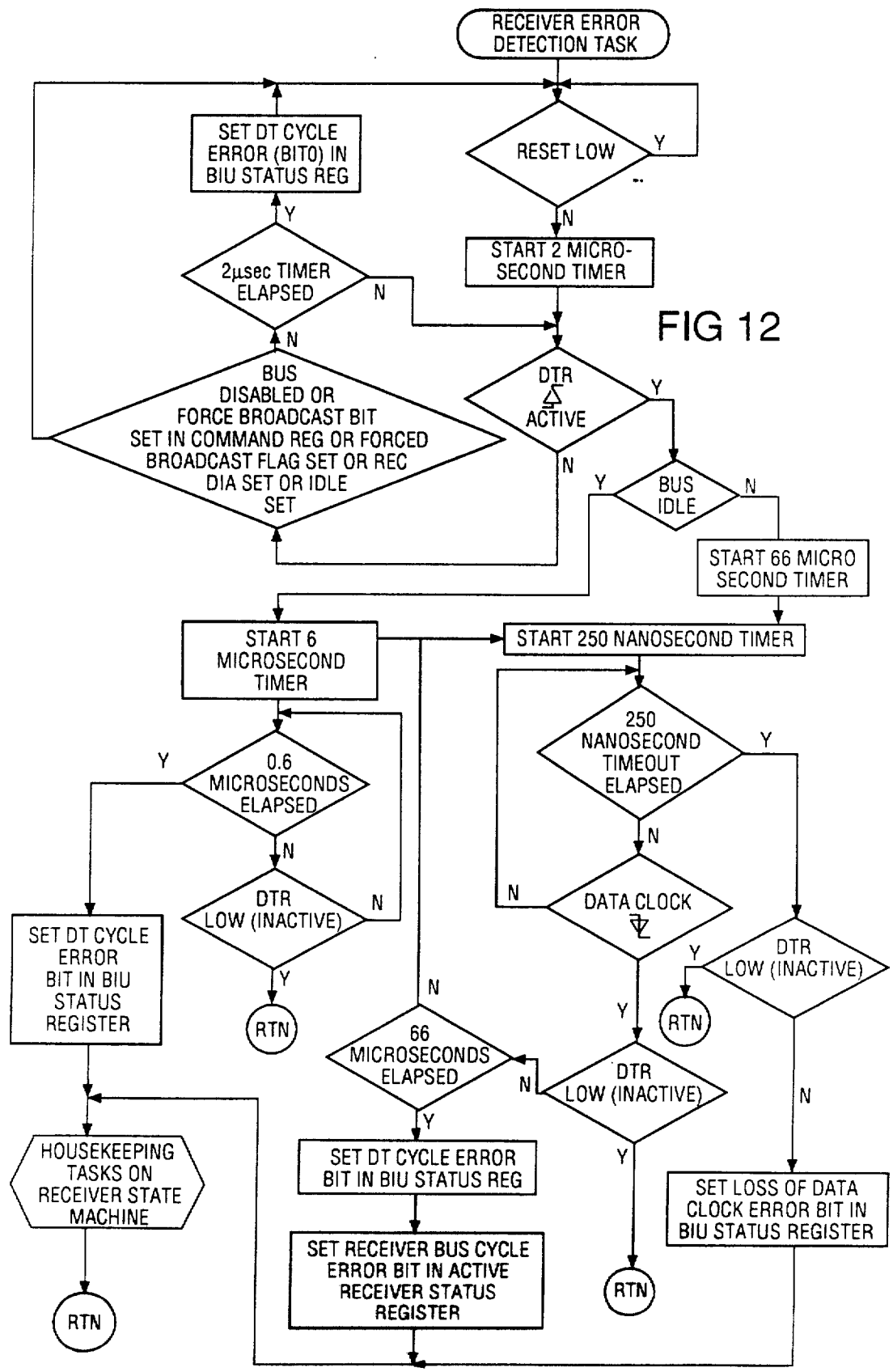
FIG. 12 is a flow diagram illustrating the operation of detecting errors while receiving data.

Referring now to the flow diagrams of FIG. 12, the receive state machine 130 performs error diagnostics during the bus cycle for determining data transfer bus cycle errors, receive bus cycle errors or loss of data clock errors. If the BIU is not in a reset mode, a 2 microsecond timer is initiated. (The 2 microseconds exceed the length of the status period.) Within the 2 microseconds, the state machine looks to see whether the DTR signal goes active, whether the bus is disabled by the microprocessor, whether a forced broadcast is addressed, whether the BIU is performing receiver diagnostics or whether the idle mode has been set. If none of these conditions exists, a DT cycle error bit is set in the BIU status register. If the DTR signal goes high during the 2 microseconds and the bus is not in an idle mode, then a 66 microsecond timer and a 250 nanosecond timer are set. The 66 microseconds represent the maximum time that data can be transmitted over the SPINE, and the 250 nanoseconds represent the length of time between strobes of the data clock. The receiver state machine 130 then waits for a data clock pulse and for the DTR signal to go low (inactive) before the 66 microseconds elapse. If this condition does not occur, the DT cycle error bit is set in the BIU status register. If, after the 250 nanosecond timeout has elapsed, the DTR signal does not go low, the loss of data clock error bit is set in the BIU status register.

If the bus is in an idle mode, a 0.6 microsecond clock is set. If the DTR signal does not go low during the 0.6 microseconds, the DT cycle error bit is set in the BIU status register.

BIU/BUS Interface Circuitry

Figure 7:
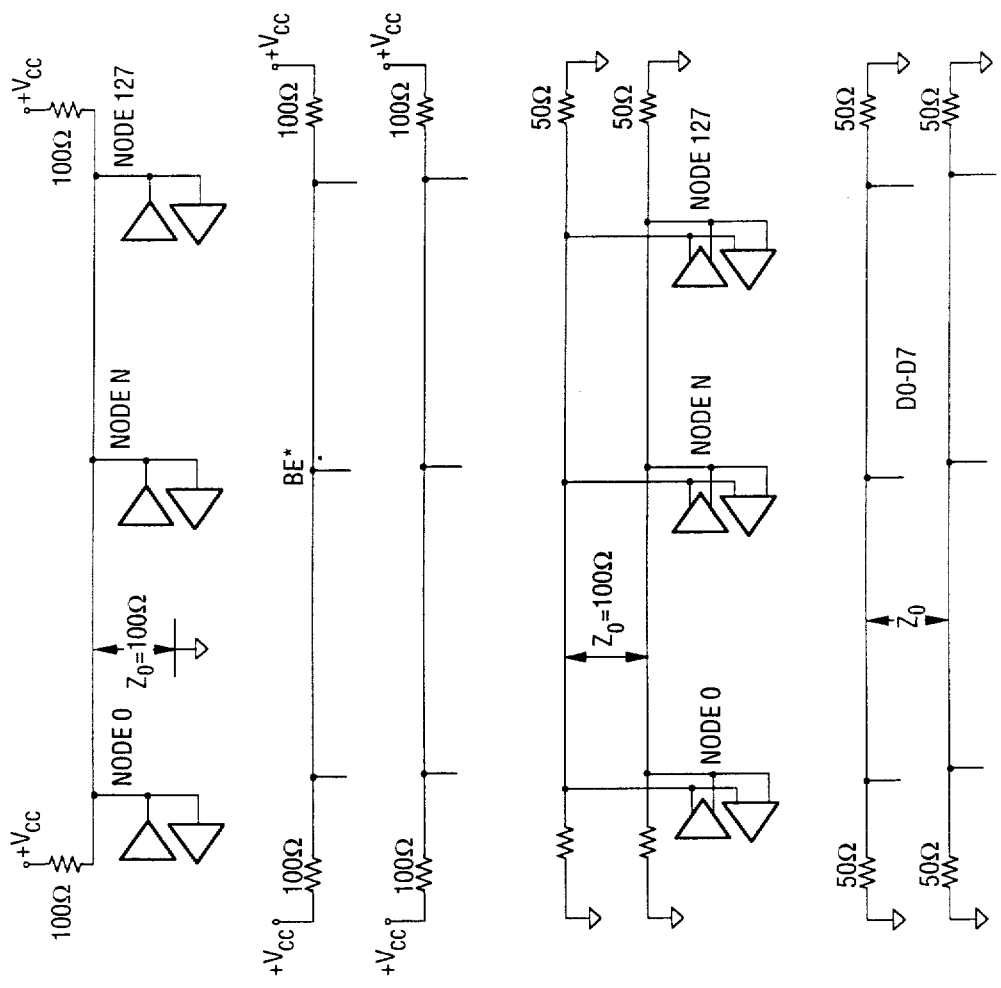
FIG. 7 is a circuit schematic of the single-ended (upper half of figure) and differential (lower half) lines of the buses of the network.

Referring to FIG. 3, an interface circuit is provided between each BIU and the SPINE. Seven single-ended transceivers $T_1$-$T_7$ ($T_2$ and $T_3$ not shown), each in an open-collector configuration, driving a 100 ohm characteristic impedance, wire ORed transmission line, are connected to the eight arbitration lines I through VIII and the DT*, BE*, and AR* status lines IX through XIV. Transmission over these lines is at 800,000 bps. There are also nine differential transceivers $DT_1$ through $DT_9$ ($DT_3$ through $DT_8$ not shown), eight data bus lines, and one data clock, DC, each driving 100 ohm multiplexed transmission lines MTL at 4,000,000 bps. All of these interface circuits are duplicated so that each BIU 14 has an identical interface circuit for both its master and slave halves. The seven wire-ORed lines are terminated at each end with 100 ohm pull-up resistors $R_1$ connected to +5 V (also see FIG. 7). The 100 ohm differential-pair lines are terminated at each end with two 50 ohm resistors $R_2$ to ground (one on each side of the signal pair). Both the wire-ORed and differential lines have a continuous 100 ohm characteristic impedance along their entire length.

Host interface

Referring to FIG. 13, the host interface for the BIU is designed to be compatible with 8, 16, 32, or 64 bit processors, including the MC 68000. With a 16 bit processor, the present invention employs two BIU's in a multiple configuration; however, a single BIU interface will be described here for simplicity.

The BIU host interface is functionally made up of a number of individual registers and register banks (i.e., transmitter and receiver packet buffers), all addressable by the processor and listed by address in a host addressable register identification system. Each register is addressed by an address bus 150, which passes through address buffer 216. The BIU also receives the NOT CE line (which is a function of the NOT AS signal from the processor and the high order address bits from the processor) and the NOT DS line. The data is transferred between the host and the BIU registers via the 8 bit data bus 156, which passes through data buffer 218, using the processor's R/NOT W line to control the direction of the bi-direction data bus. The control signals NOT RESET, HSCIK, R/NOT W, and NOT DTACK are transferred between the host processor and the BIU through control buffer 220. Data is valid during a processor write cycle as soon as the NOT DS line goes low and remains valid until NOT DS returns high. The BIU must latch the data during this period for successful data transfer to occur. As soon as the BIU has latched the data onto the data bus, it will set the NOT DTACK line low and will hold it low until after NOT DS goes high.

Figure 19B:
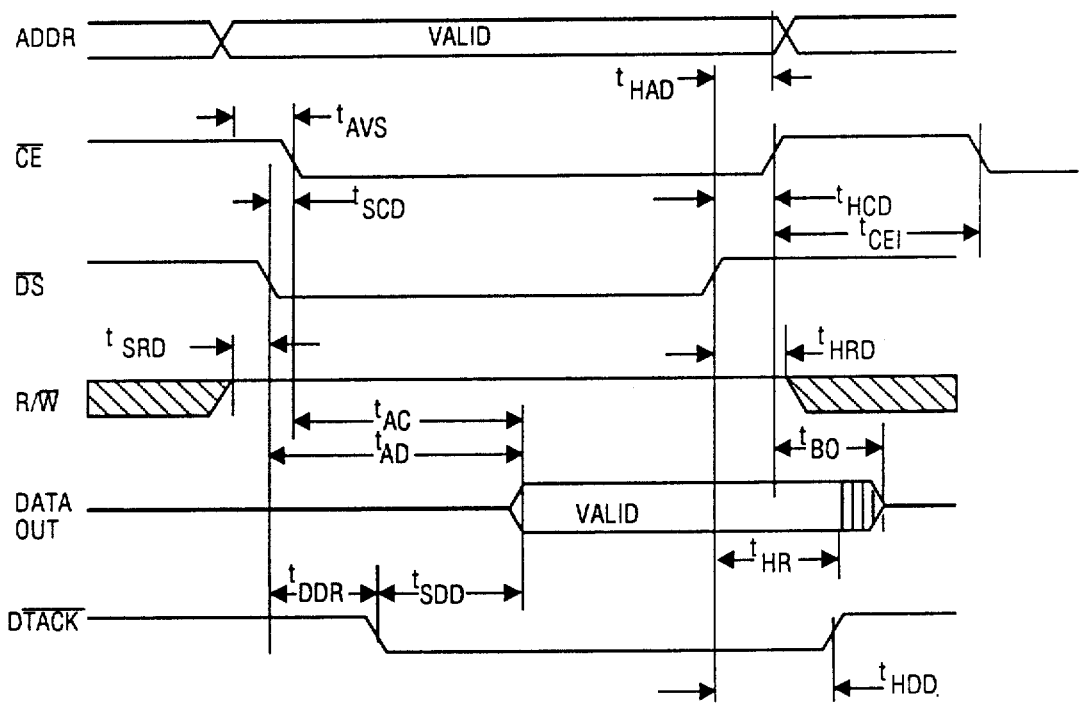
FIG. 19B is a read cycle timing diagram for the host interface section.
Figure 19C:
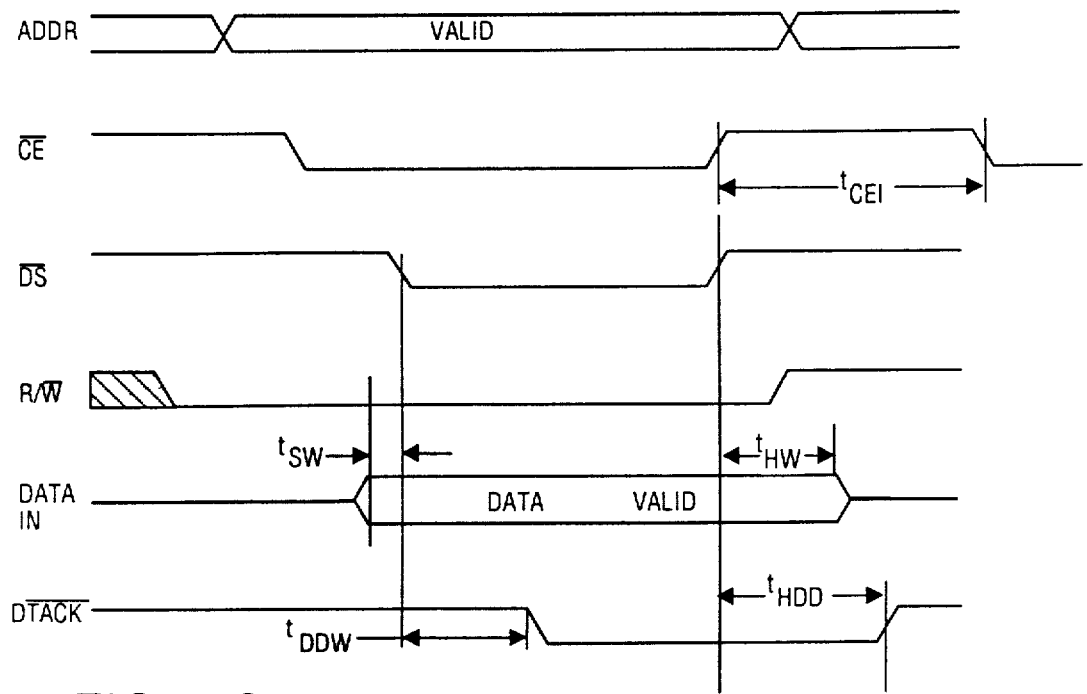
FIG. 19C is a write cycle timing diagram for the host interface section.

During a processor read cycle, the BIU again uses the address bus 150, subject to the status of NOT CE and NOT DS, to access the appropriate register. When the R/NOT W line is high, the bi-directional data bus 156 is placed in the output direction and the BIU places its data on the data bus 156 as soon, after NOT CE and NOT DS go low, as possible. To avoid unnecessary wait states in the processor, the BIU will also set NOT DTACK as soon as possible after NOT CE and NOT DS go low. An exception to this timing scheme is provided for reads from the receive packet buffers 134, because contention between BIU receive data writes and processor reads can occur. The BIU write cycle will take precedence over the processor read cycle and the BIU does not reset NOT DTACK until the BIU is sufficiently complete with its write cycle to guarantee a successful processor read cycle. The timing requirements for these signals are shown in FIGS. 19A, 19B and 19C.

Figure 9:
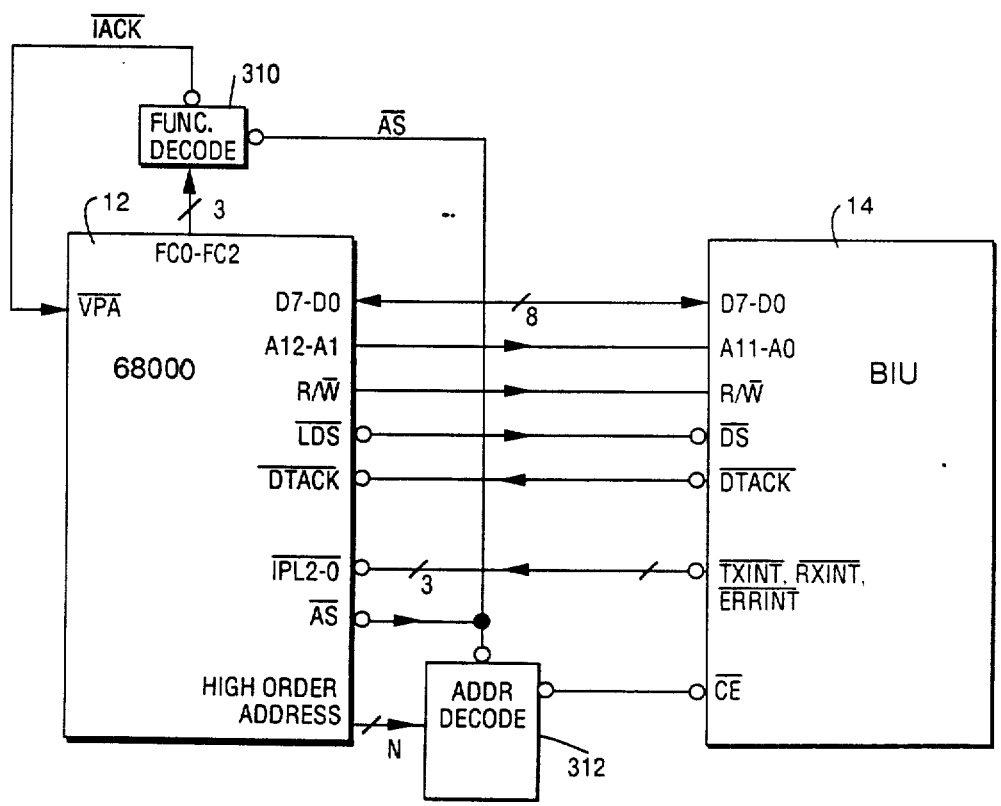
FIG. 9 is a simplified block of the BIU host interface section.
Figure 11A:
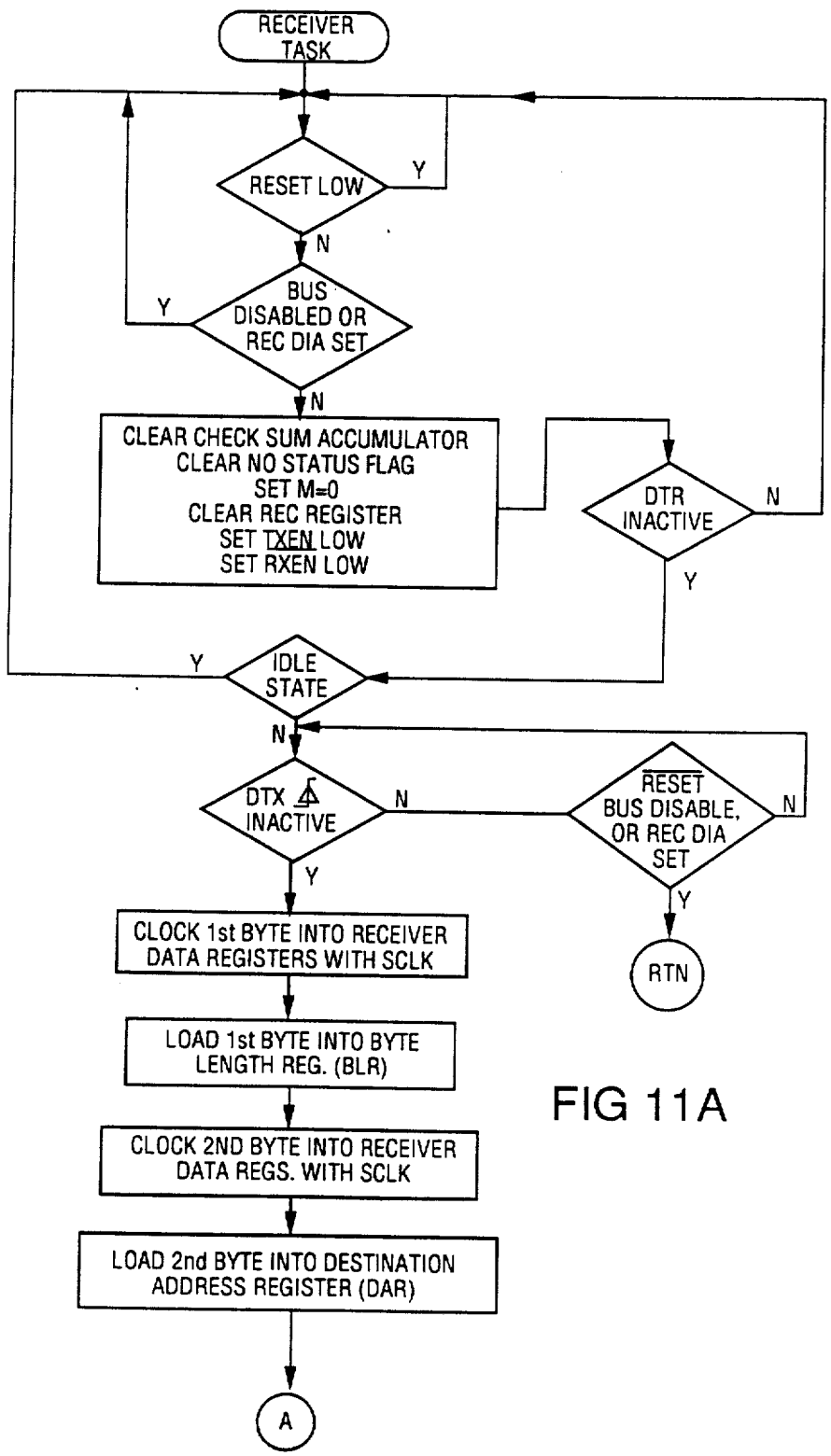
FIGS. 11A–11D are flow diagrams illustrating the operation of receiving data.
Figure 11B:
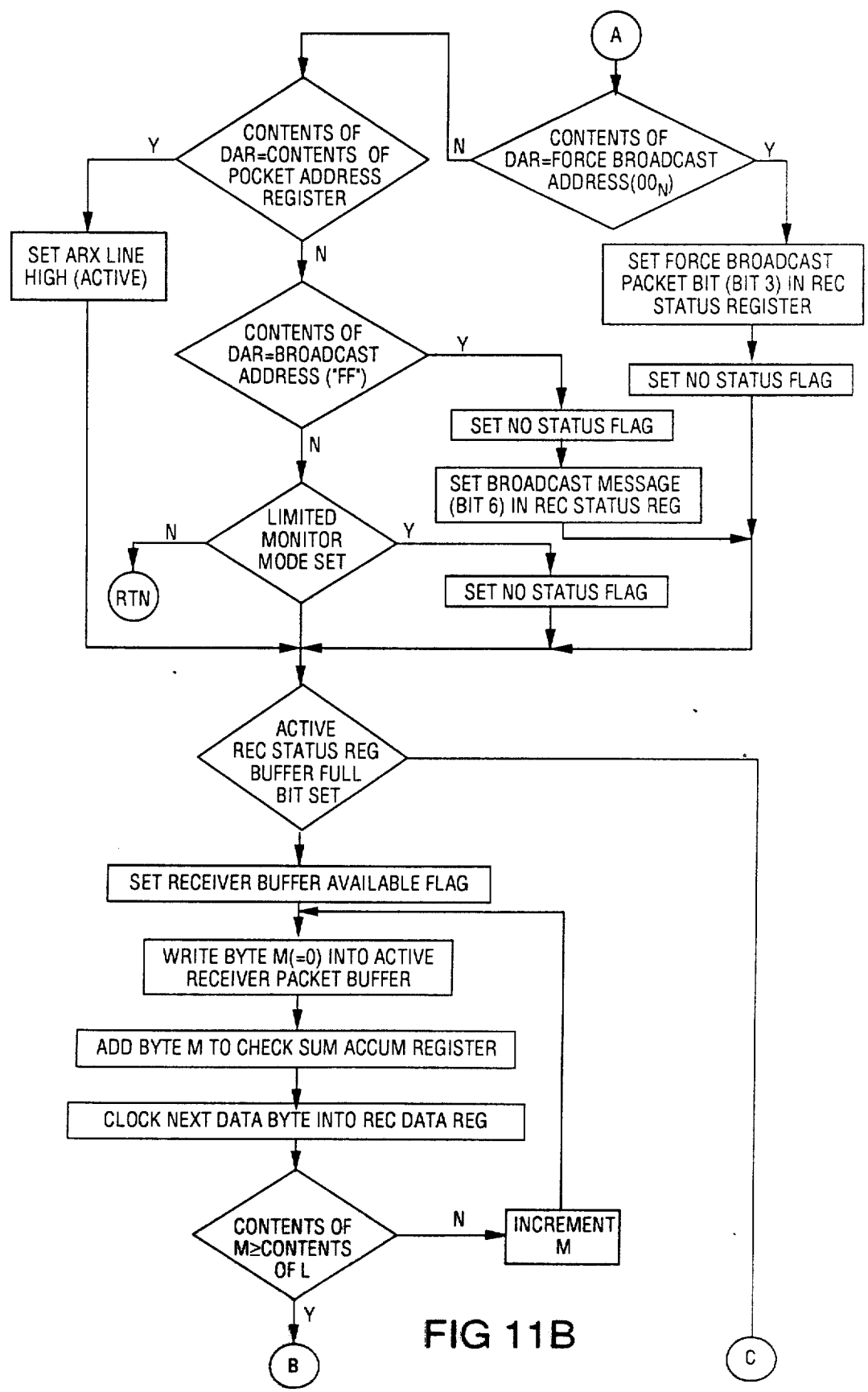
Figure 11C:
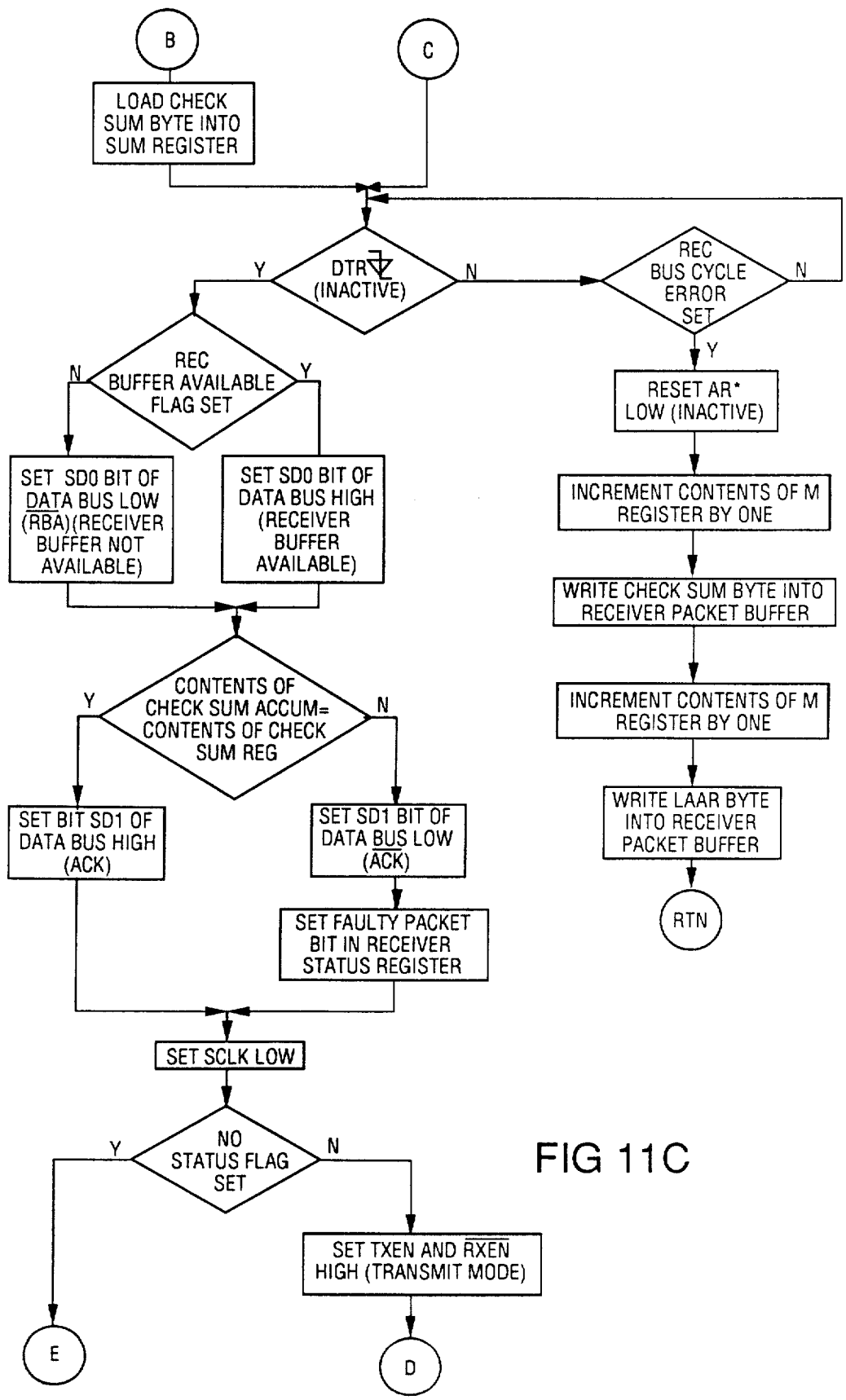
Figure 11D:
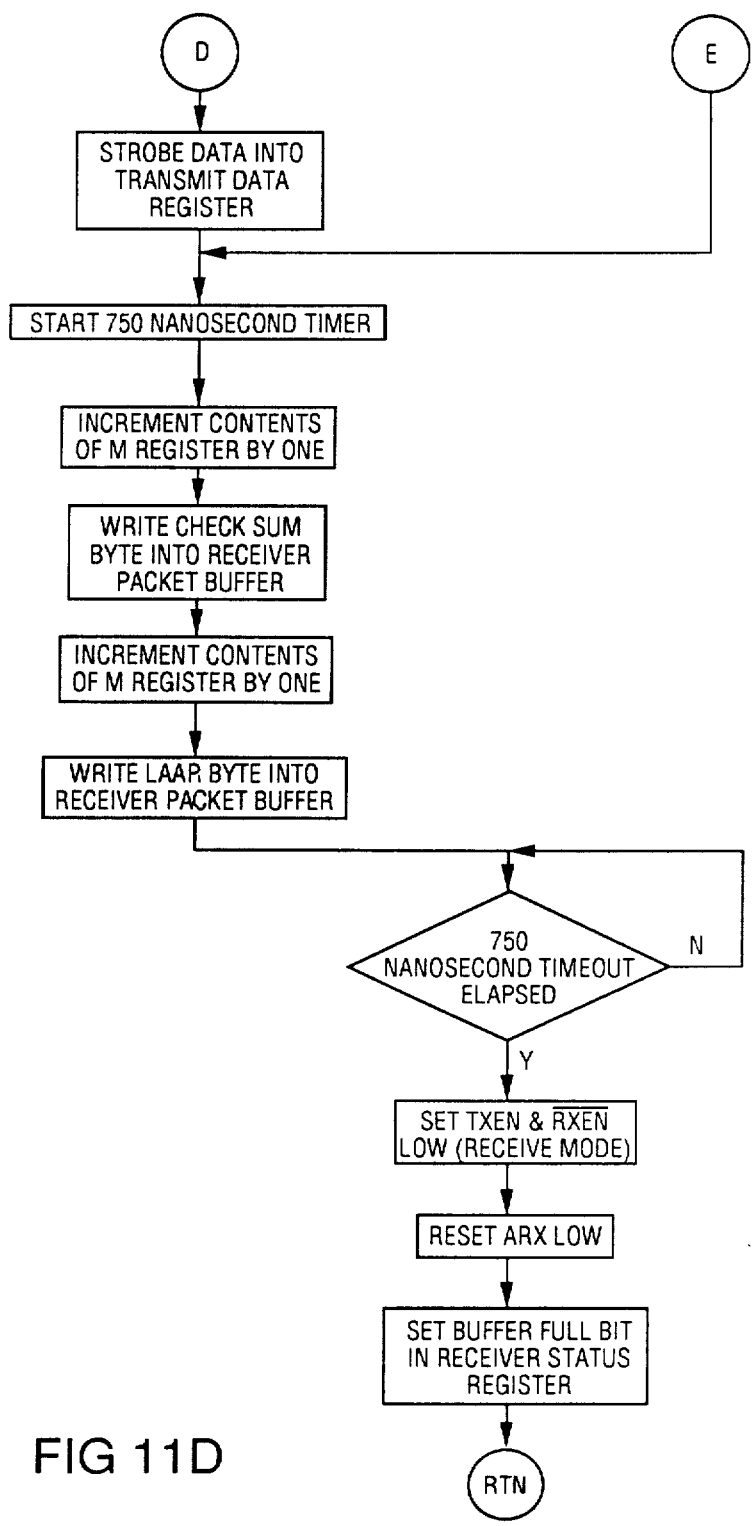

A BIU interrupt buffer 160 provides three, open-drain interrupt control output signals for the host processor. All BIU interrupts are performed using the auto-vector operation of the host processor (MC 68000). True vectored interrupts are not supported by the BIU. As shown in FIG. 9, an auto-vector interrupt requires external decoding of the MC 68000's IACK signal from the function code (0–2) outputs and returns it as VPA. The external decoding is accomplished by means of function code decoder 310. Address decoder 312 decodes the high-order address bits of processor 12. Using this configuration, the three BIU interrupts, NOT TXINT, NOT RXINT and NOT ERRINT each cause the processor to interrupt and jump to the memory address loaded into the respective address vector in the host processor.

It is also possible of course, to wire-OR any of these BIU (s) interrupts together so as to provide a greater number of interrupts for the rest of the host system. An interrupt pending bit for each of the three active BIU interrupt lines is set in the inactive status register to allow the host to differentiate between the individual interrupts when the interrupts are wire-OR ed together.

Any of the BIU Interrupt lines (NOT TXINT, NOT RXINT, or NOT ERRINT) can be reset by resetting the appropriate interrupt pending bit in the inactive status register. In addition, the TXINT line and its transmit interrupt pending bit can be reset automatically by setting the buffer full bit in the inactive transmit status register high. (The buffer full bit is set high every time a transmit packet buffer becomes full.) Similarly, the RXINT line and its receive interrupt pending bit can be reset automatically by clearing the buffer full bit in the receive status register. The resetting of any interrupt line is conditional upon the status of other pending interrupts. (For example, the NOT RXINT line may be reset when it is asserted as described above, but the NOT RXINT line will be immediately re-asserted if a new full receive packet buffer is pending and subsequently becomes current when the prior receive status buffer full bit is cleared.

The BIU Not Reset line, when active, will reinitialize the entire BIU to the normal idle condition. All internal registers (except for the transmitter and receiver packet buffers) will be cleared to zero's. The only other exception is a transmit pointer register, which will be set to $1_H$, and a current receive buffer pointer which is set to $7_H$ during the reset procedure. All BIU state machines are initialized, and at the end of the reset procedure, each state machine will establish the conditions necessary to go into normal operation. NOT Reset also forces all BIU input/output lines into an idle state. All BIU SPINE data and clock lines (SD0-SD7 and SCLK) go into a receive mode, NOT TXEN and NOT RXEN are set low (receive mode), and the SPINE FDX output lines (DT*, BET, and ARBTO-3) are set low. The interrupt BIU lines are all set to receive mode (RXSYNC 0-2, TXSYNC, and TXRDY, all of which are discussed below) and their inputs are disabled while the NOT TXERR output is set high. The host interface sets the data bus (D0-D7) 156 into the receive mode, and forces the interrupts (NOT TXINT, NOT RXINT, and NOT ERRINT) and NOT DTACK high. Not Reset also clears the master/slave/expander registers (M/S/E Reg), discussed below, which leave all BIUs in a given node in the slave mode initially, and clears both the processor address register (PAR) and the packet address registers (PKAR), leaving all SPINE nodes with the same arbitration and data packet address. Therefore, it is necessary for the peer processor at each node to boot all its BIUs with the upper most byte as master, and to load both the PAR and PKAR with the peer s physical address, so that proper system operation can take place.

Not Reset may be asserted at any time during operation by the processor or during the power on sequence by a power on reset circuit. During operation, the reset sequence will not cause a glitch in the SPINE when done to a single node, but instead will synchronize that node to the rest of SPINE. The reset sequence initializes the BIU by clearing or presetting all the BIU registers as is appropriate. A switch over command also causes an internal reset, which is similar to the reset that occurs when a BIU is powered on, except that no BIU registers are affected.

Multiple BIU Operation

To expand the SPINE Bus, multiple BIU chips may be connected in parallel at each SPINE node. Each BIU's SPINE input/output is bused to all the other BIUs in the system that process the same byte of the respective 16, 32, or 64 bit word. Hence, increased throughput is accomplished via increased bus width and not increased bit rate.

When a SPINE node is expanded, it is necessary to provide a mechanism by which all the BIUs in that node operate in concert. This is accomplished by means of the inter-BIU lines, which are wired in parallel between each BIU within the node. In addition, all BIUs within a node are classified as master, slave, and as expander or non-expander by means of via the master/slave/expander (M/S/E) registers.

Referring to FIG. 14, there are six inter-BIU lines in the inter-BIU interface, which provide the system designer with the ability to expand the SPINE BUS from 8 bits wide to 16, 32, or 64 bits wide. These lines include three receive sync lines: RXSYNC 0, RXSYNC 1, RXSYNC 2; one transmit sync line, TXSYNC; a transmit ready line NOT TXRDY; and a transmit error line NOT TXERR. The receive sync lines are three I/O lines that are outputs from the master BIU (MBIU) and that provide the slave BIU (SBIU) with the binary address of the particular receiver packet buffer that is presently in the active receive mode. The transmit sync I/O line is an output from the MBIU that provides the SBIU(s) with the address of the active transmit packet buffer. Any discrepency between this address and that of the SBIU's active transmit packet buffer causes a transmit out-of-sync error bit to be set in the SBIU(s) status register, and causes the NOT ERRINT line to be set low. The transmit ready I/O line is an output from the MBIU that provides the SBIU(s) with the status of the MBIU arbitration bus. When a BIU node (i.e. multiple BIUs acting as one SPINE interface for a host) is in the transmit mode and the MBIU has arbitrated and won the SPINE bus, NOT TXRDY is set high, and all BIUs in the node transmit a data package. NOT TXRDY is cleared when NOT DT is asserted (active). The transmit error open drain line is normally pulled up (internally) in both the MBIU and SBIU(s). Any transmit error status signals (i.e., No Address Recognize, No Receive Buff Available, or No Acknowledge) returned from the receiving node and received by the MBIU or SBIU(s) will cause NOT DT to be asserted and detected by the remaining BIU(s) in the node. An asserted NOT TXERR line will prevent any BIU from resetting the buffer full bit in its transmit status register to empty, thereby inhibiting NOT TXINT and preventing transmission of the contents of the next transmit packet buffer. NOT TXERR is cleared by the clearing of the active transmit status registers.

The master BIU performs all arbitration and, using the NOT TXRDY line, starts the data transmit cycle for the entire node (slave BIUs, and expanders as well as the master BIU itself). The NOT TXRDY line follows the state of the arbitration state machines' transmit ready flag in the master BIU only. (When the transmit ready flag is set, TXRDY is low.) The receive sections in all of the BIUs operate independently of each other, using their respective DTR lines to start the receive cycle. The master BIU also outputs the current binary value of both its transmit pointer and its receive pointer over the TXSYNC and the RXSYNC (0-2) lines, respectively. Each slave and expander BIU receives these signals and compares them with the contents of its own internal transmitter pointer register and receiver pointer register. Any discrepancy between the TXSYNC and the internal transmit pointer will cause the BIU (salve or expander) to set its transmit out-of-sync error bit in the BIU status register. Similarly, any discrepancy between the three RXSYNC lines and the three bits of the receivor pointer register will cause the BIU (slave or expander) to set its receive out-of-sync error bit in the BIU status register.

The NOT TXERR line informs all the BIUs in the node of any transmit error condition which occurs in the entire node. Any BIU with a transmit error (i.e., NOT AR, NOT ACK, or NOT RBA for packet status information) pulls the NOT TXERR signal low, and each BIU in the node detects the active condition on its own respective NOT TXERR line. In response, each BIU s transmit state machine 116 will either retry (i.e., retransmit the data packet once, if the node is in retry mode) or halt and wait for the processor to service the transmit interrupt which was generated by the single BIU which had the initial transmit error. Once the host processor resets the transmit interrupt line NOT TXINT, it must also clear the buffer full bit in the active transmit status register before the node can transmit the next data packet. When the buffer full bit is cleared, the transmitter state machine 116 resets the NOT TXERR line to the high state.

Priority

Ordinarily each pair of BIUs, or SPINE node, arbitrates and transmits data across the SPINE once per bus round. This guarantees a deterministic access to the bus by each processor, i.e., each processor is certain of obtaining access within a maximum time period (i.e., the number of connected processors multiplied by the time required to transmit the maximum allowable data packet and status words). In order to allow selected processors to have even greater priority than their physical addresses alone would allow, the capability is provided for a processor to set a priority register in its BIUs specifying the number of data packets that it may transmit during each bus round. The minimum such number is always one, and the maximum can be any number which still allows other processors sufficient access to the bus. But even when a number greater than one is set in a priority register, back-to-back transmission by one SPINE node is not permitted.

Fault Detection and Recovery

As indicated, each processor 12 is connected to the SPINE by two relatively autonomous BIUs, a master 14A and a slave 14B. Both BIUs are normally active, each transmitting roughly half of the data sent and received by the associated processor. Arbitration, however, is normally performed by only one of the two BIUs (the master) at each SPINE node.

To recover from a single point failure, the system locates the fault, decides whether it resides within the SPINE or is unique to a single processor and associated BIUs, and if within the SPINE, determines which half (master 14A or slave 14B) has failed. The various fault detection procedures already described are used by each BIU to detect the onset of a failure—the check sum test on received data, the return of RBA and ACK status words to the transmitter, and a variety of timers to provide verification of successful bus cycles and rounds. Each of these tests for faults is nondisruptive and the results are kept as part of a SPINE node error log. Any SPINE node (typically a dedicated system management node), can interrogate the error log of any processor and therefrom estimate the location of the system fault. Based on that estimate, the system management processor can perform off-line diagnostics with the other processors. These may include a R/W test of all BIU buffers and registers, an internal loop back of the SPINE, and a polling of SPINE nodes. In performing these diagnostics, the data packets sent between BIUs should contain duplicate data in each half (master and slave) of the transmitted words, so that a single common fault cannot prevent an otherwise operable node from receiving data from the system manager. To minimize the disruption caused by such off-line diagnostic tests, it is preferred that the tests be designed so that only a SPINE node being interrogated is affected. A "force broadcast", in which a BIU may override arbitration and hold the arbitration address 00 (hexadecimal) on the bus indefinitely while broadcasting a diagnostic command, may be used in such diagnostic tests. As with the broadcast mode, force broadcast would be detected, saved, and noted in the receive status register.

Once a fault has been located, the system enters a two-tiered recovery process. When a faulty node (pair of BIUs) has been detected, it is removed, if possible, from the SPINE. When this is not possible, because of the nature or location of the fault, a switchover from the faulty to the good half of the SPINE is accomplished, by any processor (typically the system management processor) by setting the BE* line low at its good BIU. All other BIUs in the SPINE immediately recognize the active BE* signal and switch over to that half of the SPINE. In doing so, each BIU notifies its processor that fallback has occurred. The processor, in turn, enables the good half of the SPINE, by making it the master, and initiating an internal restart. All the BIUs on the good half of the SPINE then begin arbitration and data transfer. The internal restart is similar to power on/reset except that no BIU registers or buffers are cleared.

If a BE* line itself fails, the BIU will recognize the failure and fall back to the side of the bus not containing the bad BE* line.

SPINE Transmission Lines

The SPINE is a redundant masterless, parallel-bus network designed to connect a preferred maximum of 72 processors over short distances. In its present configuration, it will pass 4 M byte per second data (MRV), 16 bits wide, over a distance of 100 feet with 72 loads distributed more or less evenly in 12 groups. In addition, redundant clock signals, control signals, arbitration signals, and status signals are included in the bus for a total of 32 parallel signals in the SPINE bus.

The parallel data bus and other lines making up the SPINE are physically implemented as a distributed system of backplanes, twisted pair cables, and line-termination circuits comprising a parallel transmission line. These components have been designed to account for the effects of propagation delay, line attenuation, crosstalk, and impedance-mismatch reflections.

Propagation delays along the 100 foot long SPINE bus dictate transmission line solutions, and though the four MBPS rate is not particularly high, the combination of frequency attenuation, cross talk, and reflection due to interface and loading effects make signal recovery somewhat difficult. Complicating this is the need to use an open-collector (or WIRED-OR) scheme for some of the signals (the arbitration and bus control signals) because, in addition to providing different characteristic impedances (Zo) in each state, a "Wire-ORed glitch" occurs due to the distributed current-sharing nature of active, open-collector drivers. For this reason, among others, the data bus 16 is separated from the arbitration and control bus 22 in the transmission system. Separation also allows arbitration to take place during data transmission, thereby making SPINE somewhat insensitive to the inherent delays of Wired-ORed arbitration.

In order to solve inherent cross talk of a long parallel bus, as well as ambient noise and FCC requirements, a single characteristic impedance (Zo) had to be maintained over the length of the SPINE bus, with proper terminations at each end, despite the effect of variable lump loading along the cable.

In order to control the impedance (Zo) in the transmission line, a twisted pair cable was used. In a flat version of the twisted pair cable, mass termination is possible and a parallel bus configuration is economically feasible. When the twisted pair cable is used differentially, a significant reduction in cross talk is achieved. In addition, differential mode operation will reduce the amount of the radiated energy. Cross talk is also a major problem in long parallel cable systems. The use of differential twisted pairs reduces cross talk significantly, as long as the level of the induced signal does not exceed the common mode rejection ratio (CMRR) of the receiver. Unfortunately, this is only a partial solution because some of the SPINE signals must be run Wired ORed, which is generally a single-ended technique.

One solution for reducing cross talk for a single-ended technique is to use individually shielded twisted pairs which drastically reduce cross talk for a trade-off of higher costs and higher capacitance.

Another solution would involve interspersing grounds between the signal runs to reduce coupling The receiver would make use of the synchronous nature of this cross talk to reject it, or make use of slew rates control drivers to reduce the rise and fall times, and thereby reduce the cross talk levels.

The last distortion parameter which we must consider is reflection due to mismatched impedances (Zo). On a simple point to point circuit which drives signals from one end to the other, with both ends terminated in the characteristic impedance, Zo, there are no reflections. For twisted pairs a round trip delay is substantially increased. Since synchronous transmission data must be clocked at the 50% point of the bit to reduce the effect of systemic distortions, line reflections must be kept to a minimum to avoid transmission errors.

By separating the parallel bus into differential lines and single-ended lines, a much better Zo match can be made on the differential line through the use of current mode drivers and terminating resistors than can be done with most open collector drivers. In addition, it is preferred that compatible receivers have low thresholds and high input impedance which allow a large number of devices (greater than 72) to use in a multiplexed configuration.

Another effect which causes impedance (Zo) mismatch is loading. Although the differential lines are essentially driven point to point, the transmission line must pass through sections in which six ports are grouped within a nest and other sections in which there are no cards. This nonuniform load distribution has the effect of lowering the impedance (Zo) of the line in the area of the nest and is dependent on the number of cards inserted at any time.

With twelve nests in any one SPINE system, the multiple reflections could be devastating, particularly when coupled with the previously mentioned distortions. This effect is equally disruptive in both the single ended and differential lines. However, the former has another additional source of signal reflection; namely, the wired ORed glitch. This effect is caused by multiple open-collector drivers, where all the drivers are on (logic 0), hence sharing the load current of the pull-up resistors, and the effect is distributed over a distance greater than the wavelength of the signal s rise time. When some (not all) of these drivers turn off, a voltage wave front propagates away from the switching driver.

A solution to the reflections caused by mismatched impedance (Zo) (and one which will reduce the impact of the wired OR-ed glitch) is to use microstrip line techniques to compensate for the sections of transmission line which are shunted by the BIU port cards. Microstrip line techniques involve taking a two-layer port card back plane (signal and ground layers) and controlling the width of etch and height of etch above the ground plane to provide a transmission line circuit with controlled impedance (Zo) and capacitance per unit length of line. Accordingly, a port card back plane can be designed so that the unloaded impedance (Zo) is higher than the impedance (Zo) of the interconnecting twisted pair cable. When loaded down by port cards, the impedance (Zo) of the back plane closely matches that of the cable, thus reducing reflections. By picking the normally loaded case as three BIU cards, the reflection coefficient for load variations from one to six cards is significantly reduced.

For the case of the single ended signals which require the wired OR-ed configuration, reflection is significantly reduced by reducing the data transmission for arbitration. Since the data transmission is separate from the arbitration transmission, and since data transmission and arbitration are done in parallel, the arbitration bit rate is not overly critical, particularly when long data packets are being transmitted, i.e., packets are greater than 12 bytes or three microseconds). With three microseconds to perform the three arbitration group address contention cycles, or one microsecond per byte settling time, all perturbations of the single-ended signals have died out and the line has reached equilibrium.

Figure 15:
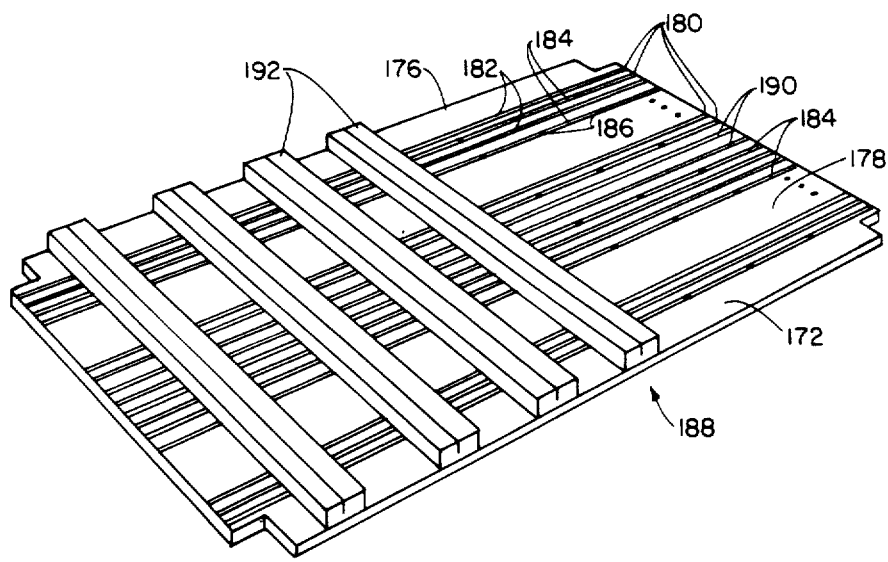
FIG. 15 is a perspective view of a microstripline backplane of said embodiment.

Referring to FIGS. 15 and 16, each SPINE node (pair of BIUs and processor) resides on a circuit card 170. Six such cards are connected to a backplane 172, to form a nest 174. With the preferred maximum of 72 nodes, there are twelve such six-card nests. Twisted pair cables 176 are used to make connections between the twelve nests. As discussed above, such cables have the advantage of being easily mass terminated, and when used with the differential transceivers 32 (FIG. 3) of the SPINE interface circuitry, crosstalk and noise susceptibility is acceptable (and radiated energy is greatly reduced, easing compliance with FCC regulations). Line attenuation can be reduced by using larger than conventional wire gauge (e.g., larger than 28 AWG). Further reductions in crosstalk can be achieved by using individually-shielded twisted pairs or by interspersing grounded wires between twisted pairs.

Several precautions can be taken to minimize the effects of signal reflections from impedance mismatches. The differential lines used for sending data and clock pulses can be terminated using current-mode drivers and terminating resistors. The backplanes of the nests can be built using microstripline techniques to provide a backplane characteristic impedance that closely matches the impedance of the twisted pair cable connecting the nests. Inserting processor/BIU cards into the nest will lower the backplane impedance, making the degree of impedance mismatch dependent on the number of such cards installed, but the effect of changing the number of cards can be minimized by designing the backplane so as to match the twisted-pair impedance for an average load of processor/BIU cards (e.g., three out of six possible].

The backplane 172 comprises a fiberglass-epoxy board 176 (Norplex Type G10, 0.125 inch thick, $e_r=5.3$) which has a continuous conductive ground plane 178, and a plurality of parallel conductive microstrips 180 (1.5 mil thick). Single-ended strips 182 (10 mil wide) for carrying the nondifferential signals (arbitration signals A0-A3, DT*, BE*, and AR*) are separated by ground strips 184 (10 mil wide), which are connected to the ground plane 178 by plated-through holes 186 at each connector location 188. Pairs of differential strips 190 (each 50 mil wide) for carrying the differential signals (data D0-D7 and clock DC) are separated by further ground strips 184 (50 mil wide), which are also plated through to the ground plane 178. All strips 182, 184, and 190 are 1.5 mil thick, spaced from the ground plane 178 a distance of 49 mil, and spaced from adjacent strips a distance of 100 mil (center to center). This provides a characteristic impedance (before loading from circuit cards) of 115 ohms for the single-ended lines 182 and 70 ohms for the differential lines 190.

As shown in FIG. 16, eight circuit board connectors 192 are mounted transversely across the microstrips, with the microstrips being connected to pins of the connectors (not shown). The center six connectors 192 receive processor/BIU cards 170. The other two connectors receive cable circuit cards 194, which serve to make connections between the backplanes 172 and the twisted-pair cables 176 connecting the nests.

An alternative to the microstrip backplane construction is a single-twist, flat cable with PCB edge connectors spaced appropriately along its length.

OTHER EMBODIMENTS

Other embodiments are within the following claims. For example, a narrower width than 16 bits could be used for the data bus; more than two data buses could be used, but preferably they are divided into two groups, master and slave; a longer bus length than 100 feet could be used, but round trip delays may undesirably lengthen bus timing; a greater number of nodes could be used, so long as the transceiver circuitry at each node will accommodate a greater number.

What is claimed is:

1. Network apparatus for connecting a plurality of processors, said apparatus comprising
   a first parallel data bus connected to each processor for transmitting data between said processors,
   a second parallel data bus connected to each processor for transmitting data between said processors,
   means for transmitting data such that a portion of the transmitting data is transmitted on the first parallel data bus and the remaining portion is transmitted on the second parallel data bus simultaneously across both said buses during normal operation,
   means at each processor for detecting the presence of a failure in either bus and for establishing which bus contains the failure,
   means at each processor for shifting data transmission exclusively to said first data bus if said second data bus has failed and to said second data bus if said first data bus has failed, said data transmission thereafter being carried out at a lower data rate than the data rate during normal operation.

2. The network apparatus of claim 1 wherein said first and second data buses have equal data handling capacity, and the data transmission rate after a failure on one bus is half the normal rate.

3. The network apparatus of claim 1 wherein
   said apparatus further comprises separate first and second arbitration buses for transmitting arbitration signals between processors to establish which processor is allowed to use said data buses,
   arbitration means at each processor for sending and receiving said arbitration signals over one or the other of said arbitration buses and for deciding the outcome of an arbitration, and
   means for using only said first arbitration bus for arbitration during normal operations and for switching to said second arbitration bus after a failure has been detected either in said first data bus or first arbitration bus.

4. The network apparatus of claim 3 further comprising a status bus connected to each processor for transmitting one or more status signals from the receiving processor to the transmitting processor.

5. The network apparatus of claim 4 wherein said status signals include an address-recognized (hereinafter "AR") signal, and wherein said apparatus further comprises means for generating said AR signal during a data transmission when a processor recognizes its address and begins to receive data.

6. The network apparatus of claim 5 further comprising means at the transmitting processor for detecting the absence of said AR signal and for halting transmission of data.

7. The network apparatus of claim 3 wherein said apparatus further comprises first and second fault-detect lines associated with each data bus connected to said processors, wherein means are provided at each processor for activating a said fault-detect line to inform other processors of whether failure is located in said first buses (i.e., first data, first arbitration) or in said second buses, and wherein means are provided at each processor for sensing said fault-detect lines and initiating a switch to the group of buses (either first or second) not having the failure.

8. The network apparatus of claim 7 wherein means are provided at each processor for activating said fault-detect line corresponding to the good set of buses when a failure is detected on any bus in the other set of buses.

9. The network apparatus of claim 3 wherein said arbitration means at each processor includes (1) means for applying a processor's priority (or address) code to said first arbitration bus during normal operations and to said second arbitration bus if either said first data bus or said first arbitration bus has failed, (2) means for determining whether that processor has won the arbitration by determining whether its priority was in the highest of all the codes being applied to that time, (3) means for instructing the processor to begin data transmission over both said first and second data buses during normal operations and exclusively over one of said first and second data buses if the other of said data buses has failed, (4) means for waiting until no other processor applies its priority code to the said first arbitration bus during normal operations and to said second arbitration bus if either said first data bus or said first arbitration bus has failed (hereinafter "an idle condition") after that processor has transmitted over both said first and second data buses during normal operations and exclusively over one of said first and second buses if the other of said data buses has failed on one occasion (or a predetermined number of occasions greater than one).

10. The network apparatus of claim 9 wherein said priority codes each contain more bits than there are lines on each of said first and second arbitration buses and wherein said arbitration means includes (1) means for applying portions of said codes sequentially to said first arbitration bus during normal operations and to said second arbitration bus if either said first data bus or said first arbitration bus has failed, (2) means for determining after each portion is applied whether a processor remains in contention, and (3) means for continuing to assert further portions of said code only if said processor remains in contention.

11. The network apparatus of claim 3 wherein said arbitration means includes means for performing said arbitration simultaneously with data transmission so that the determination of which processor transmits during a transmission interval is made during the prior transmission interval.

12. Network apparatus for connecting a plurality of processors, said apparatus comprising
- one or more data buses connected to each processor for transmitting data between said processors,
- a first arbitration bus connected to each processor for transmitting arbitration signals between said processors,
- a second arbitration bus connected to each processor for transmitting arbitration signals between said processors,
- either of said arbitration buses being capable of independently transmitting all of said arbitration signals,
- arbitration means at each processor for sending and receiving said arbitration signals over one or the other of said arbitration buses and for deciding the outcome of an arbitration,
- failure-detection means connected to said arbitration buses for detecting a failure in either said first or second arbitration bus and for informing said processors of which arbitration bus has said failure,
- switchover means at each processor for responding to said failure-detection means and for switching to the arbitration bus not having the failure.

13. Network apparatus for connecting a plurality of processors, said apparatus comprising
- a parallel data bus connected to each processor for transmitting data between said processors,
- a status/control bus connected to each processor for transmitting status/control information between said processors,
- a plurality of circuit boards each containing at least one said processor,
- a plurality of backplanes, each of which are connected to a group of said circuit boards, each said backplane comprising an insulator board, microstriplines on one surface of said board, a conductive ground plane spaced from said microstriplines, and connector means for connecting said microstriplines to said circuit boards, and
- a plurality of twisted pairs of wires electrically connecting said microstriplines on said backplanes,
- the impedance of said microstriplines being matched to the impedances of said twisted pairs of wires.

14. The network apparatus of claim 13 wherein each line of said data bus is a differential line and comprises a pair of microstriplines on each said backplane and a twisted pair of wires extending between said backplanes.

15. The network apparatus of claim 14 wherein said pairs of microstriplines are separated from one another on said backplane by interspersed microstriplines connected to said ground plane.

16. The network apparatus of claim 15 wherein the total length of each line of said data buses, including the lengths of all said backplane and cable sections, is less than 100 feet.

17. The network apparatus of claim 14 further comprising a multiline arbitration bus connected to each processor, the lines of said arbitration bus being single-ended and comprising single microstriplines on said backplanes.

18. The network apparatus of claim 17 wherein said single-ended microstriplines are separated by interspersed lines connected to said ground plane.

19. The network apparatus of claim 17 wherein the speed of transmission on said differential lines forming said data bus is greater than the speed of transmission on said single-ended lines forming said arbitration bus, and wherein transmission on said data bus and transmission on said arbitration bus are simultaneous.

20. Network apparatus for connecting a plurality of processors, said apparatus comprising
- a parallel data bus connected to each processor for transmitting packets of data between a transmitting processor and a receiving processor, each said packet containing up to a predetermined maximum number of words of data,
- an arbitration bus connected to each processor for transmitting arbitration codes between said processors,
- arbitration means associated with the arbitration bus for determining which processor will be said transmitting processor during a given transmission,
- a status bus connected to each said processor for transmitting one or more status signals from the receiving processor to the transmitting processor either during or after transmission of each data packet,
- wherein each said data packet contains the addresses of the receiving and transmitting processor and the number of words of data in the packet,
- wherein said status signals include an address-recognized (hereinafter "AR") signal and comprising means at each said processor for inspecting an address transmitted as part of the data transmitted across said data bus to determine whether the processor is to be the receiving processor and for generating said AR signal,
- and further comprising means at the transmitting processor for detecting the absence of said AR signal and for halting transmission of data,
- wherein said status signals further comprise a receiver buffer available signal ("RBA") and a check-sum acknowledge signal ("ACK") and further comprising means at each processor for generating said RBA signal by comparing a received word indicating the size of the transmitted data packet to the available space in a buffer memory in which received data is stored and means for generating said ACK signal by computing a sum of the received data and comparing it to a transmitted check sum.

21. Network apparatus for connecting a plurality of processors, said apparatus comprising
- a parallel data bus connected to each processor for transmitting packets of data between a transmitting processor and a receiving processor, each said packet containing up to a predetermined maximum number of words of data, an arbitration bus connected to each processor for transmitting arbitration codes between said processors, arbitration means associated with the arbitration bus for determining which processor will be said transmitting processor during a given transmission, a status bus connected to each said processor for transmitting one or more status signals from the receiving processor to the transmitting processor either during or after transmission of each data packet, wherein each said data packet contains the addresses of the receiving and transmitting processor and the number of words of data in the packet, wherein said processors reside on different circuit boards, and wherein said data bus extends across a backplane connecting said circuit boards, wherein said apparatus comprises a plurality of said backplanes, each with a plurality of said circuit boards, each said backplane comprising an insulator board, microstriplines on one surface of said board, a conductive ground plane spaced from said microstriplines, and connector means for connecting said microstriplines to said circuit boards, and a plurality of twisted pairs of wires electrically connecting said microstriplines on said backplanes, the impedance of said microstriplines being matched to the impedances of said twisted pairs of wires.

22. The network apparatus of claim 21 wherein the length of the parallel conductors forming said data bus is less than 100 feet.

23. The network apparatus of claim 21 further comprising means for transmitting data over said data bus at a transmission rate in excess of 1.0 million bytes per second.

24. Network apparatus for connecting a plurality of processors, said apparatus comprising a parallel data bus connected to each processor for transmitting packets of data between a transmitting processor and a receiving processor, each said packet containing up to a predetermined maximum number of words of data, an arbitration bus connected to each processor for transmitting arbitration codes between said processors, arbitration means associated with the arbitration bus for determining which processor will be said transmitting processor during a given transmission, a status bus connected to each said processor for transmitting one or more status signals from the receiving processor to the transmitting processor either during or after transmission of each data packet, wherein each said data packet contains the addresses of the receiving and transmitting processor and the number of words of data in the packet further comprising bus interface unit means for transmitting and receiving said packets so as to make said network apparatus transparent to said processors.

* * * * *